United States Patent
Wu et al.

(10) Patent No.: US 11,929,952 B2
(45) Date of Patent: Mar. 12, 2024

(54) SIDELINK POSITIONING REFERENCE SIGNAL PATTERN

(71) Applicant: QUALCOMM Incorporated, San Diego, CA (US)

(72) Inventors: Shuanshuan Wu, San Diego, CA (US); Kapil Gulati, Belle Mead, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/482,157

(22) Filed: Sep. 22, 2021

(65) Prior Publication Data

US 2023/0105526 A1    Apr. 6, 2023

(51) Int. Cl.
*H04L 5/00* (2006.01)
*H04W 4/029* (2018.01)

(52) U.S. Cl.
CPC ........... *H04L 5/0048* (2013.01); *H04W 4/029* (2018.02)

(58) Field of Classification Search
CPC ...................... H04L 5/00; H04L 5/0048; H04L 2025/03796; H04L 2025/03783; G01S 5/10; G01S 5/02; G01S 85/10; H04W 4/029; H04W 4/02; H04W 4/40; H04W 4/10; H04W 92/18; H04W 64/00; H04W 76/14; H04W 74/08; H04W 16/14; H04W 72/25; H04W 72/20; H04W 72/40; H04W 92/00; H04W 88/00; H04W 88/02; H04W 88/08; H04W 84/18; H04W 76/00; H04W 76/10; H04W 76/11; H04W 76/15; H04W 76/23; H04W 56/0015; H04B 7/06954; G06F 18/28
See application file for complete search history.

(56) References Cited

U.S. PATENT DOCUMENTS

| | | | | |
|---|---|---|---|---|
| 10,863,453 | B2 * | 12/2020 | Henriksson et al. | ........................ H04W 52/325 |
| 11,496,990 | B2 * | 11/2022 | Edge et al. | ......... H04W 64/006 |
| 11,523,364 | B2 * | 12/2022 | Manolakos et al. | .. H04W 64/00 |
| 2017/0285132 | A1 * | 10/2017 | Fischer | ..................... G01S 5/10 |
| 2020/0021946 | A1 * | 1/2020 | Kumar et al. | ........ H04W 4/029 |

(Continued)

FOREIGN PATENT DOCUMENTS

WO       2021041020 A1    3/2021

OTHER PUBLICATIONS

Method, Apparatus and Device for Processing Positioning Reference Signals; JP 2017510794 A (Year: 2017).*

(Continued)

*Primary Examiner* — Meless N Zewdu
(74) *Attorney, Agent, or Firm* — Thien T. Nguyen

(57) ABSTRACT

Disclosed are techniques for wireless communication. In an aspect, a first UE determine a sidelink positioning reference signal (PRS) pattern for a sidelink position estimation procedure, the sidelink PRS pattern including at least one PRS transmission occasion for each of a group of UEs on a shared communication medium, and performs one or more attempts to transmit a first PRS on one or more PRS transmission occasions associated with the first UE in accordance with the sidelink PRS pattern. In another aspects, a second UE determines the sidelink PRS pattern, and monitors a first PRS transmission occasion for receipt of a first PRS from a first UE in accordance with the sidelink PRS pattern.

38 Claims, 16 Drawing Sheets

(56) References Cited

U.S. PATENT DOCUMENTS

2022/0201774 A1* 6/2022 Bao et al. ............. H04W 76/10
2022/0365163 A1* 11/2022 Baek et al. ........... G01S 5/0072
2023/0015004 A1* 1/2023 Wu et al. .............. H04L 5/0048

OTHER PUBLICATIONS

Ko et al.: Method for Performing Sidelink Communication by First Device, Involves Determining at Least One PRS Resource for Transmitting at Least One PRS for Sidelink Positioning, and PRS Is Transmitted to Second Device Based on PRS Resource; WO 2021066592 A1 (Year: 2021).*

Dahlman E., et al., "5G NR the Next Generation Wireless Access Technology, 2nd Edition, Chapters 18-27", In: "5G NR", Sep. 18, 2020, Elsevier, XP055908003, ISBN: 978-0-12-822320-8, pp. 1-611, p. 457, line 1—p. 485, last line, 215 Pages.

International Search Report and Written Opinion—PCT/US2022/074583—ISA/EPO—dated Nov. 17, 2022.

* cited by examiner

US 11,929,952 B2

SIDELINK POSITIONING REFERENCE SIGNAL PATTERN

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a first user equipment (UE) includes determining a sidelink positioning reference signal (PRS) pattern for a sidelink position estimation procedure, the sidelink PRS pattern including at least one PRS transmission occasion for each of a group of UEs on a shared communication medium; and performing one or more attempts to transmit a first PRS on one or more PRS transmission occasions associated with the first UE in accordance with the sidelink PRS pattern.

In an aspect, a method of operating a second user equipment (UE) includes determining a sidelink positioning reference signal (PRS) pattern for a sidelink position estimation procedure, the sidelink PRS pattern including at least one PRS transmission occasion for each of a group of UEs on a shared communication medium; and monitoring a first PRS transmission occasion for receipt of a first PRS from a first UE in accordance with the sidelink PRS pattern.

In an aspect, a first user equipment (UE) includes a memory; at least one transceiver; and at least one processor communicatively coupled to the memory and the at least one transceiver, the at least one processor configured to: determine a sidelink positioning reference signal (PRS) pattern for a sidelink position estimation procedure, the sidelink PRS pattern including at least one PRS transmission occasion for each of a group of UEs on a shared communication medium; and perform one or more attempts to transmit a first PRS on one or more PRS transmission occasions associated with the first UE in accordance with the sidelink PRS pattern.

In an aspect, a second user equipment (UE) includes a memory; at least one transceiver; and at least one processor communicatively coupled to the memory and the at least one transceiver, the at least one processor configured to: determine a sidelink positioning reference signal (PRS) pattern for a sidelink position estimation procedure, the sidelink PRS pattern including at least one PRS transmission occasion for each of a group of UEs on a shared communication medium; and monitor a first PRS transmission occasion for receipt of a first PRS from a first UE in accordance with the sidelink PRS pattern.

In an aspect, a first user equipment (UE) includes means for determining a sidelink positioning reference signal (PRS) pattern for a sidelink position estimation procedure, the sidelink PRS pattern including at least one PRS transmission occasion for each of a group of UEs on a shared communication medium; and means for performing one or more attempts to transmit a first PRS on one or more PRS transmission occasions associated with the first UE in accordance with the sidelink PRS pattern.

In an aspect, a second user equipment (UE) includes means for determining a sidelink positioning reference signal (PRS) pattern for a sidelink position estimation procedure, the sidelink PRS pattern including at least one PRS transmission occasion for each of a group of UEs on a shared communication medium; and means for monitoring a first PRS transmission occasion for receipt of a first PRS from a first UE in accordance with the sidelink PRS pattern.

In an aspect, a non-transitory computer-readable medium storing computer-executable instructions that, when executed by a first user equipment (UE), cause the first UE to: determine a sidelink positioning reference signal (PRS) pattern for a sidelink position estimation procedure, the sidelink PRS pattern including at least one PRS transmission occasion for each of a group of UEs on a shared communication medium; and perform one or more attempts to transmit a first PRS on one or more PRS transmission occasions associated with the first UE in accordance with the sidelink PRS pattern.

In an aspect, a non-transitory computer-readable medium storing computer-executable instructions that, when executed by a second user equipment (UE), cause the second UE to: determine a sidelink positioning reference signal (PRS) pattern for a sidelink position estimation procedure, the sidelink PRS pattern including at least one PRS transmission occasion for each of a group of UEs on a shared communication medium; and monitor a first PRS transmission occasion for receipt of a first PRS from a first UE in accordance with the sidelink PRS pattern.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
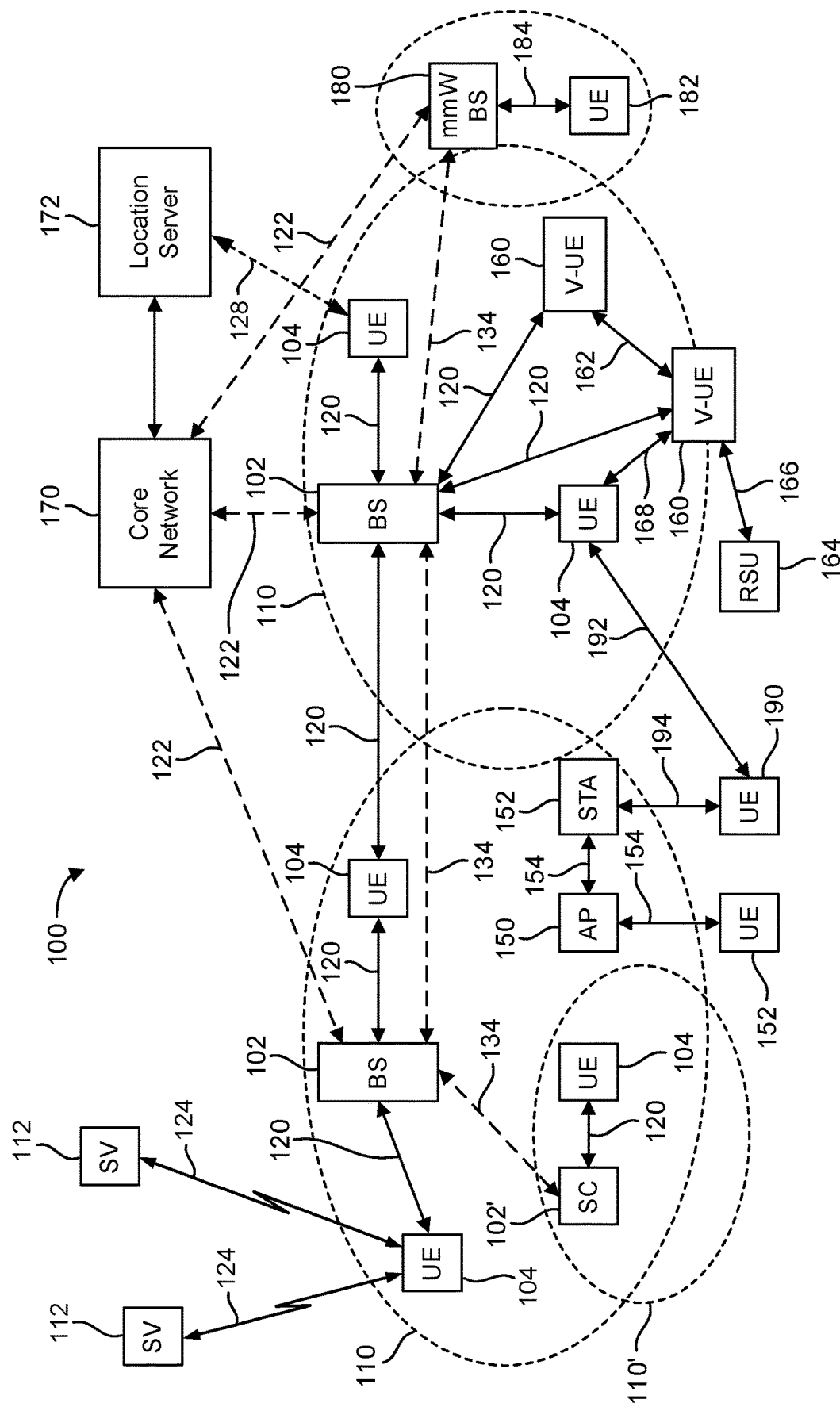
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a SGC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
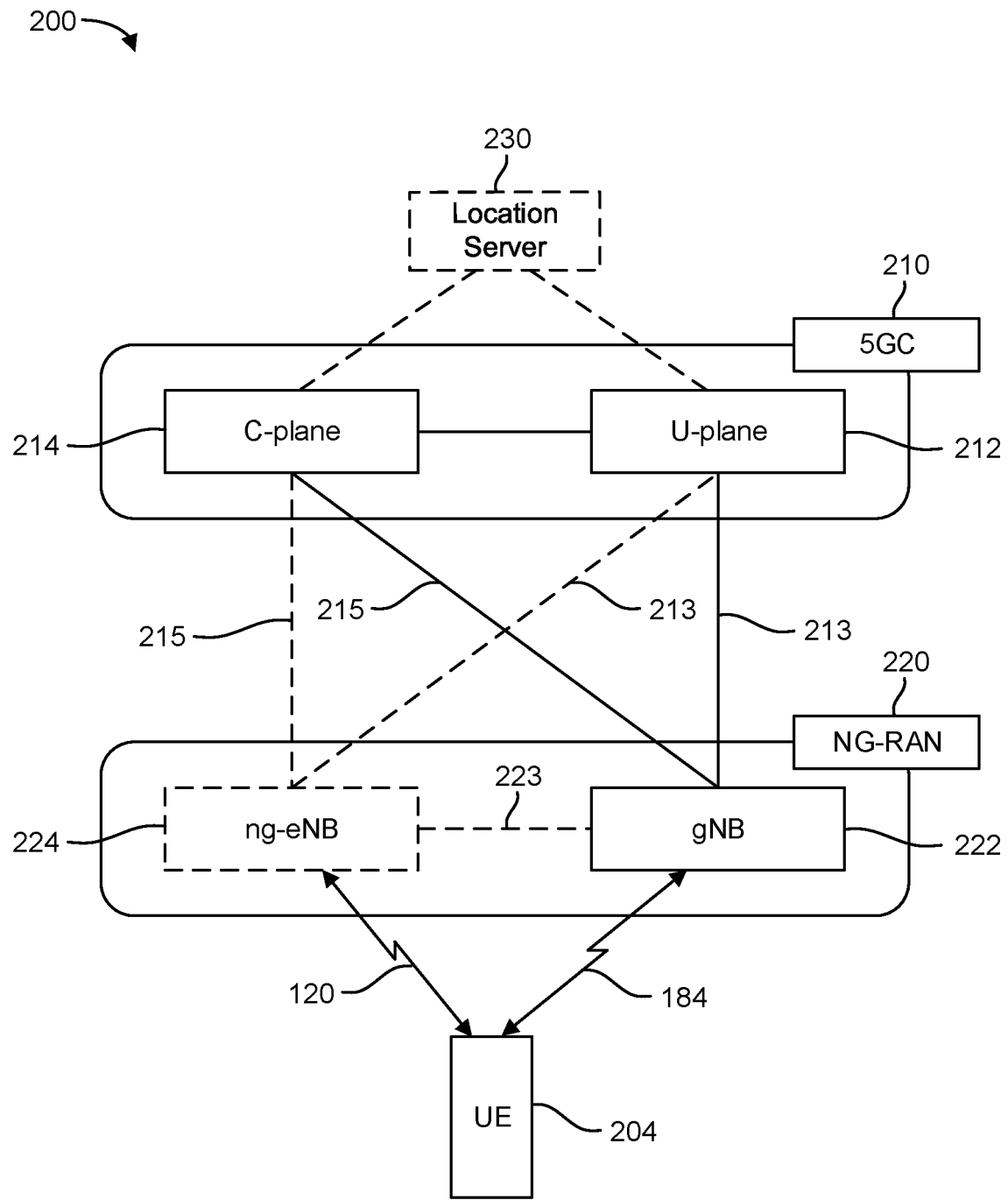
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
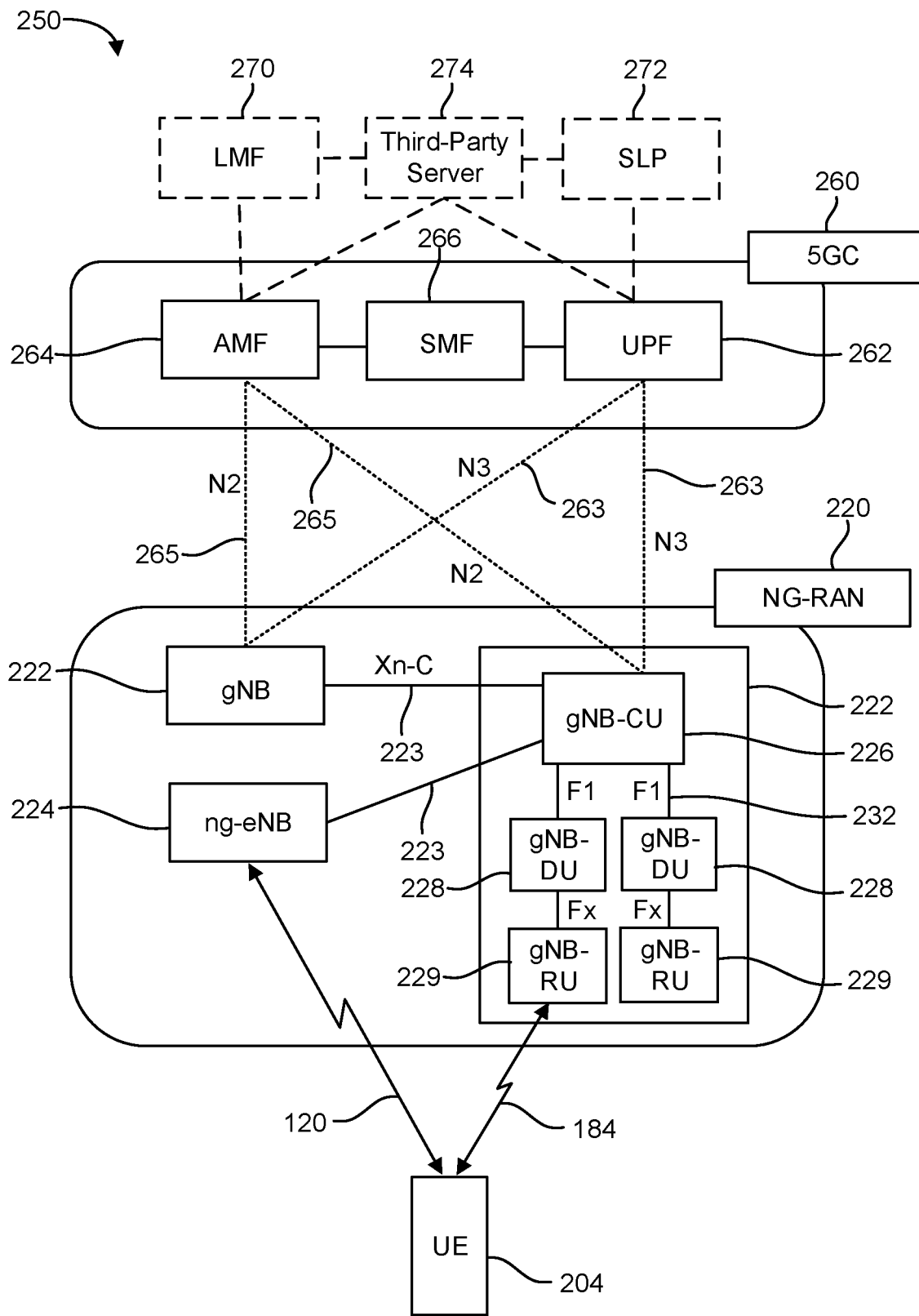

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
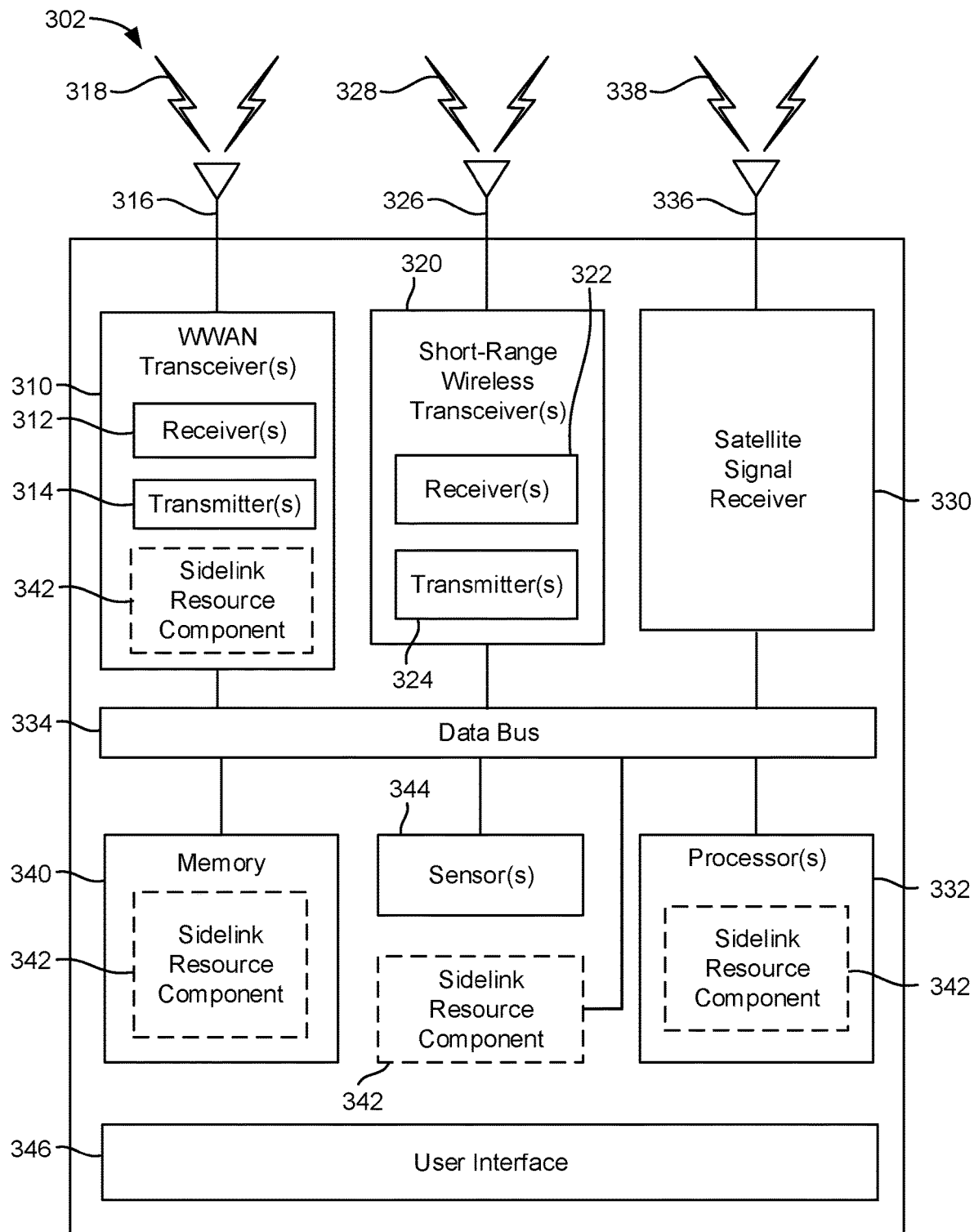
FIGS. 3A, 3B, and 3C are simplified block diagrams of several sample aspects of components that may be employed in a user equipment (UE), a base station, and a network entity, respectively, and configured to support communications as taught herein.
Figure 3B:
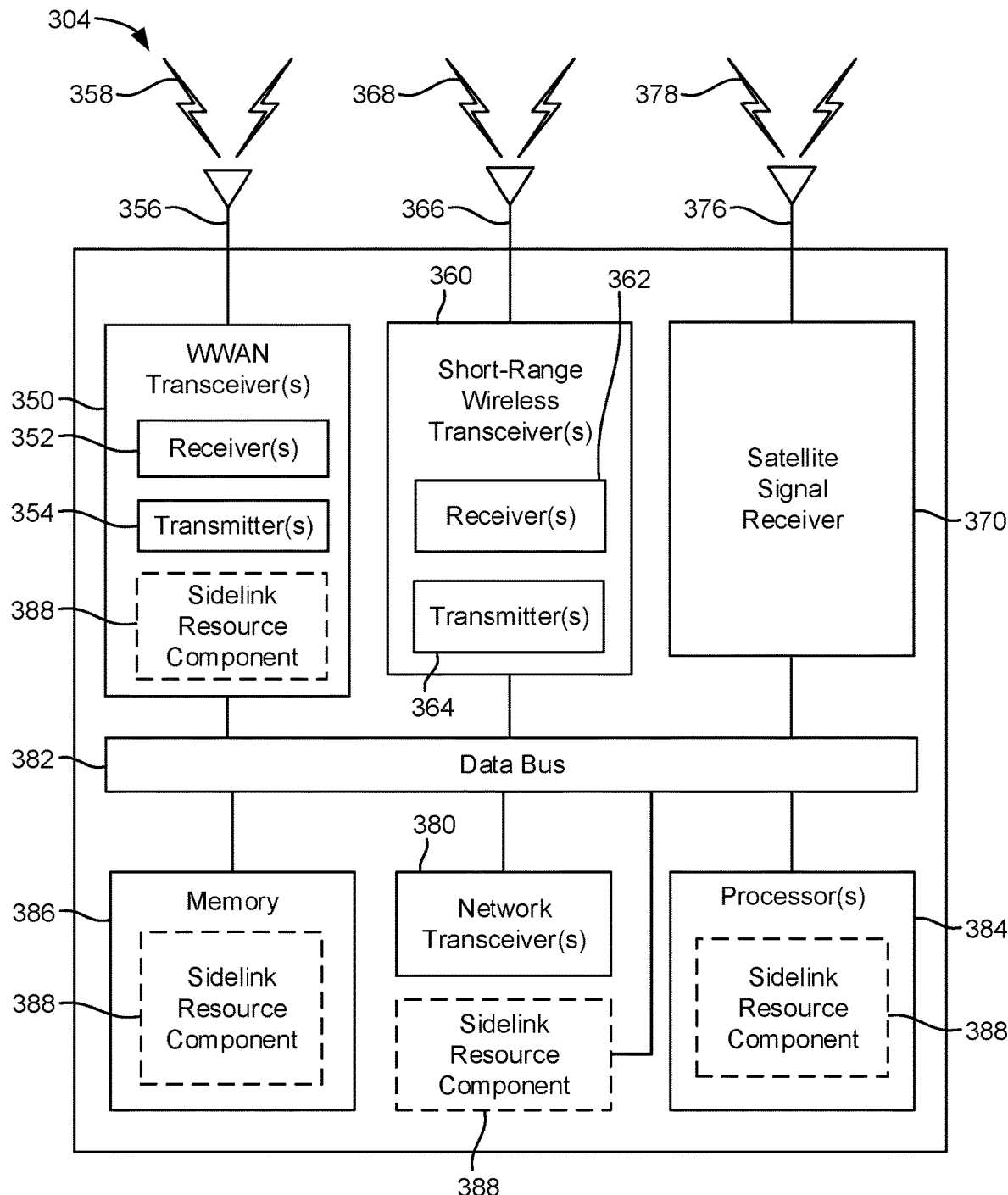
Figure 3C:
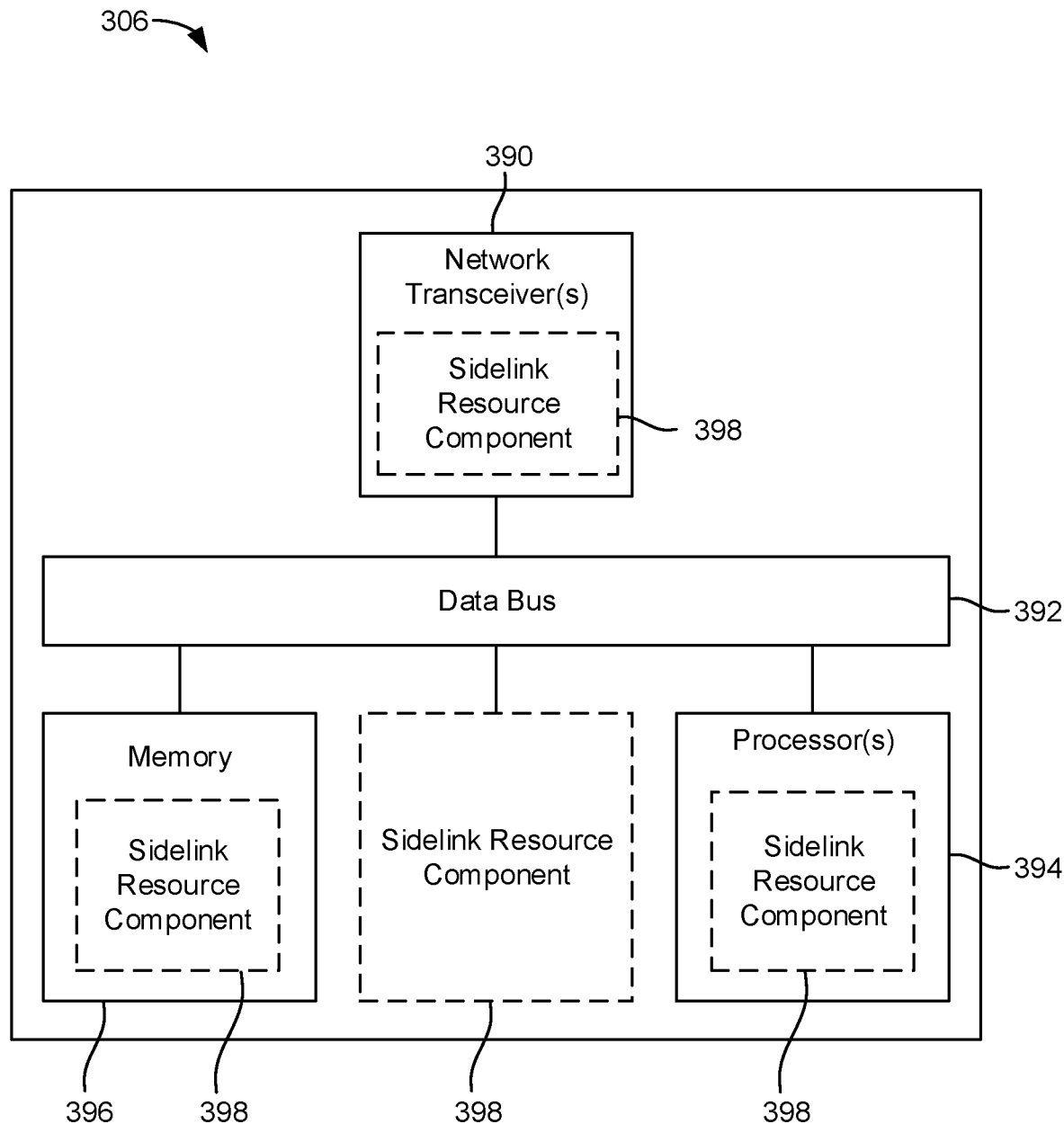

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sidelink resource component 342, 388, and 398, respectively. The sidelink resource component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sidelink resource component 342, 388, and 398 may be external to the processors 332, 384, and 394 (e.g., part of a modem processing system, integrated with another processing system, etc.). Alternatively, the sidelink resource component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sidelink resource component 342, which may be, for example, part of the one or more WWAN transceivers 310, the memory 340, the one or more processors 332, or any combination thereof, or may be a standalone component. FIG. 3B illustrates possible locations of the sidelink resource component 388, which may be, for example, part of the one or more WWAN transceivers 350, the memory 386, the one or more processors 384, or any combination thereof, or may be a standalone component. FIG. 3C illustrates possible locations of the sidelink resource component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sidelink resource component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 210/260). For example, the network entity 306 may be a component of a private network that may be configured to communicate with the UE 302 via the base station 304 or independently from the base station 304 (e.g., over a non-cellular communication link, such as WiFi).

Figure 4:
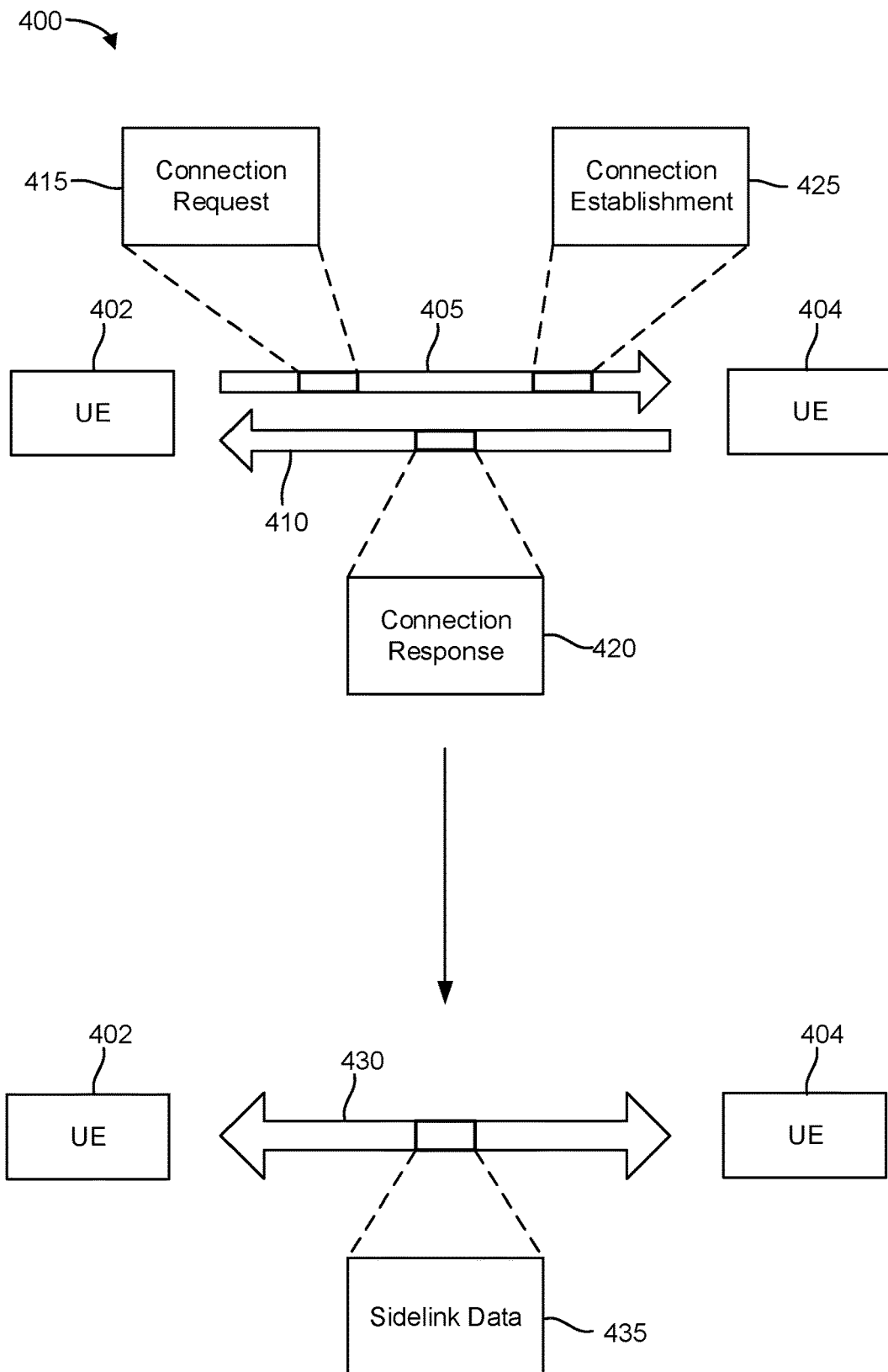
FIG. 4 illustrates an example of a wireless communications system that supports unicast sidelink establishment, according to aspects of the disclosure.

FIG. 4 illustrates an example of a wireless communications system 400 that supports wireless unicast sidelink establishment, according to aspects of the disclosure. In some examples, wireless communications system 400 may implement aspects of wireless communications systems 100, 200, and 250. Wireless communications system 400 may include a first UE 402 and a second UE 404, which may be examples of any of the UEs described herein. As specific examples, UEs 402 and 404 may correspond to V-UEs 160 in FIG. 1.

In the example of FIG. 4, the UE 402 may attempt to establish a unicast connection over a sidelink with the UE 404, which may be a V2X sidelink between the UE 402 and UE 404. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 402 may be referred to as an initiating UE that initiates the sidelink connection procedure, and the UE 404 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 402 and UE 404. For example, a transmission and reception capability matching may be negotiated between the UE 402 and UE 404. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 402 and UE 404. Additionally, a security association may be established between UE 402 and UE 404 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 402 and UE 404.

In some cases, UE 404 may create a service announcement (e.g., a service capability message) to transmit over a cellular network (e.g., cV2X) to assist the sidelink connection establishment. Conventionally, UE 402 may identify and locate candidates for sidelink communications based on a basic service message (BSM) broadcasted unencrypted by nearby UEs (e.g., UE 404). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 402 is able to detect the BSM(s). Accordingly, the service announcement transmitted by UE 404 and other nearby UEs (e.g., a discovery signal) may be an upper layer signal and broadcasted (e.g., in an NR sidelink broadcast). In some cases, the UE 404 may include one or more parameters for itself in the service announcement, including connection parameters and/or capabilities it possesses. The UE 402 may then monitor for and receive the broadcasted service announcement to identify potential UEs for corresponding sidelink connections. In some cases, the UE 402 may identify the potential UEs based on the capabilities each UE indicates in their respective service announcements.

The service announcement may include information to assist the UE 402 (e.g., or any initiating UE) to identify the UE transmitting the service announcement (UE 404 in the example of FIG. 4). For example, the service announcement may include channel information where direct communication requests may be sent. In some cases, the channel information may be RAT-specific (e.g., specific to LTE or NR) and may include a resource pool within which UE 402 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 402 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 404 in the example of FIG. 4), the initiating UE (UE 402 in the example of FIG. 4) may transmit a connection request 415 to the identified target UE 404. In some cases, the connection request 415 may be a first RRC message transmitted by the UE 402 to request a unicast connection with the UE 404 (e.g., an "RRCSetupRequest" message). For example, the unicast connection may utilize the PC5 interface for the sidelink, and the connection request 415 may be an RRC connection setup request message. Additionally, the UE 402 may use a sidelink signaling radio bearer 405 to transport the connection request 415.

After receiving the connection request 415, the UE 404 may determine whether to accept or reject the connection request 415. The UE 404 may base this determination on a transmission/reception capability, an ability to accommodate the unicast connection over the sidelink, a particular service indicated for the unicast connection, the contents to be transmitted over the unicast connection, or a combination thereof. For example, if the UE 402 wants to use a first RAT to transmit or receive data, but the UE 404 does not support the first RAT, then the UE 404 may reject the connection request 415. Additionally or alternatively, the UE 404 may reject the connection request 415 based on being unable to accommodate the unicast connection over the sidelink due to limited radio resources, a scheduling issue, etc. Accordingly, the UE 404 may transmit an indication of whether the request is accepted or rejected in a connection response 420. Similar to the UE 402 and the connection request 415, the UE 404 may use a sidelink signaling radio bearer 410 to transport the connection response 420. Additionally, the connection response 420 may be a second RRC message transmitted by the UE 404 in response to the connection request 415 (e.g., an "RRCResponse" message).

In some cases, sidelink signaling radio bearers 405 and 410 may be the same sidelink signaling radio bearer or may be separate sidelink signaling radio bearers. Accordingly, a radio link control (RLC) layer acknowledged mode (AM) may be used for sidelink signaling radio bearers 405 and 410. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 420 indicates that the UE 404 accepted the connection request 415, the UE 402 may then transmit a connection establishment 425 message on the sidelink signaling radio bearer 405 to indicate that the unicast connection setup is complete. In some cases, the connection establishment 425 may be a third RRC message (e.g., an "RRCSetupComplete" message). Each of the connection request 415, the connection response 420, and the connection establishment 425 may use a basic capability when being transported from one UE to the other UE to enable each UE to be able to receive and decode the corresponding transmission (e.g., the RRC messages).

Additionally, identifiers may be used for each of the connection request 415, the connection response 420, and the connection establishment 425. For example, the identifiers may indicate which UE 402/404 is transmitting which message and/or for which UE 402/404 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 415 and/or the connection response 420 for UE 402 and/or UE 404, respectively, to enable negotiation of corresponding AS layer parameters for the unicast connection. For example, the UE 402 and/or UE 404 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 402 and/or UE 404 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 402 and/or UE 404 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 402 and/or UE 404 may include PHY layer parameters when establishing the unicast connection to set a PHY layer context for the unicast connection. For example, the PHY layer context may indicate a transmission format (unless transmission profiles are included for each UE 402/404) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 425 message is transmitted). Before a security association (e.g., security context) is established between the UE 402 and UE 404, the sidelink signaling radio bearers 405 and 410 may not be protected. After a security association is established, the sidelink signaling radio bearers 405 and 410 may be protected. Accordingly, the security context may enable secure data transmissions over the unicast connection and the sidelink signaling radio bearers 405 and 410. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 404 may base its decision on whether to accept or reject the connection request 415 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 402 and UE 404 may communicate using the unicast connection over a sidelink 430, where sidelink data 435 is transmitted between the two UEs 402 and 404. The sidelink 430 may correspond to sidelinks 162 and/or 168 in FIG. 1. In some cases, the sidelink data 435 may include RRC messages transmitted between the two UEs 402 and 404. To maintain this unicast connection on sidelink 430, UE 402 and/or UE 404 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 402 or by both UE 402 and UE 404. Additionally or alternatively, a MAC control element (CE) (e.g., defined over sidelink 430) may be used to monitor the status of the unicast connection on sidelink 430 and maintain the connection. When the unicast connection is no longer needed (e.g., UE 402 travels far enough away from UE 404), either UE 402 and/or UE 404 may start a release procedure to drop the unicast connection over sidelink 430. Accordingly, subsequent RRC messages may not be transmitted between UE 402 and UE 404 on the unicast connection.

Figure 5:
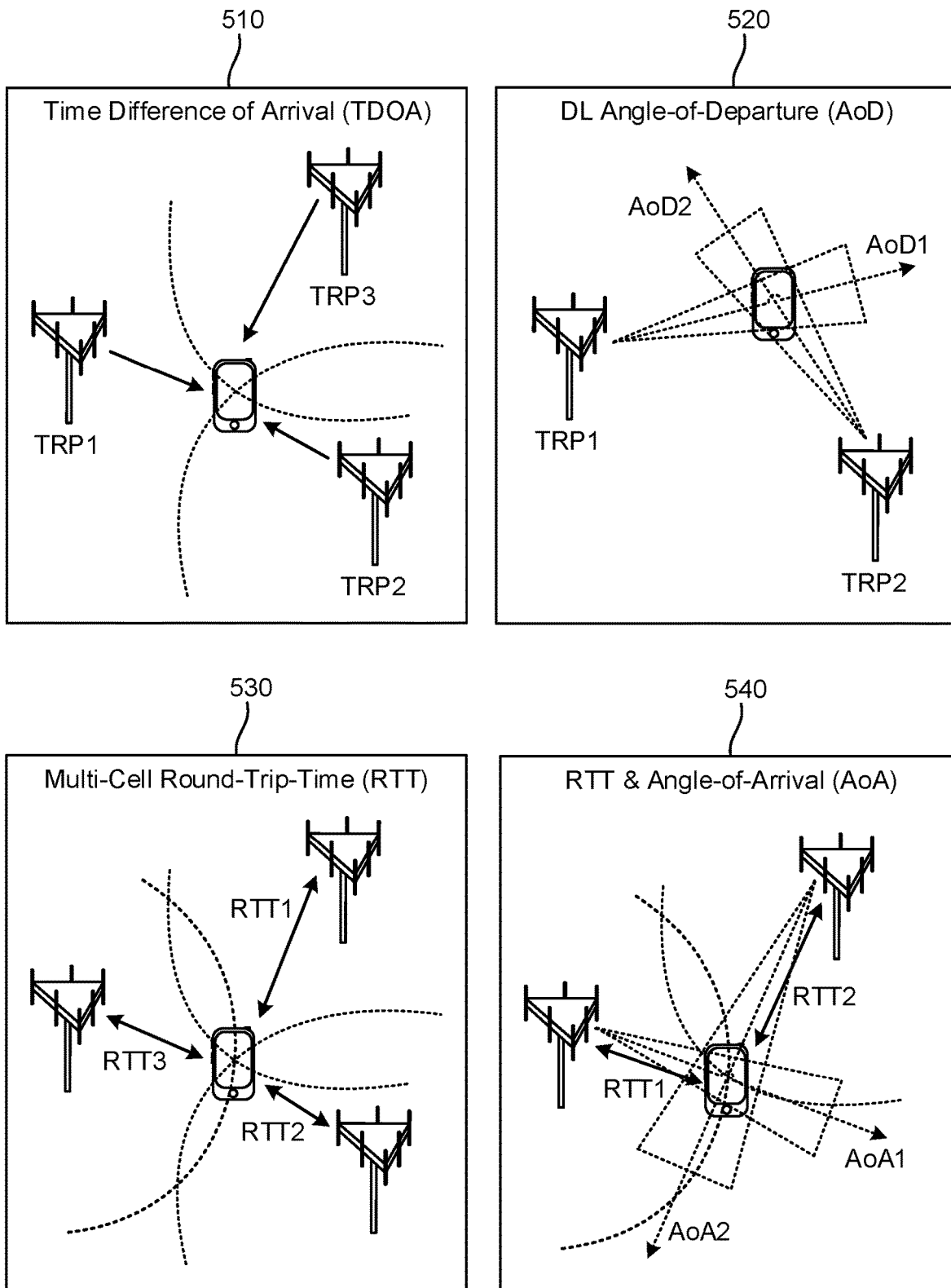
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities.

RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
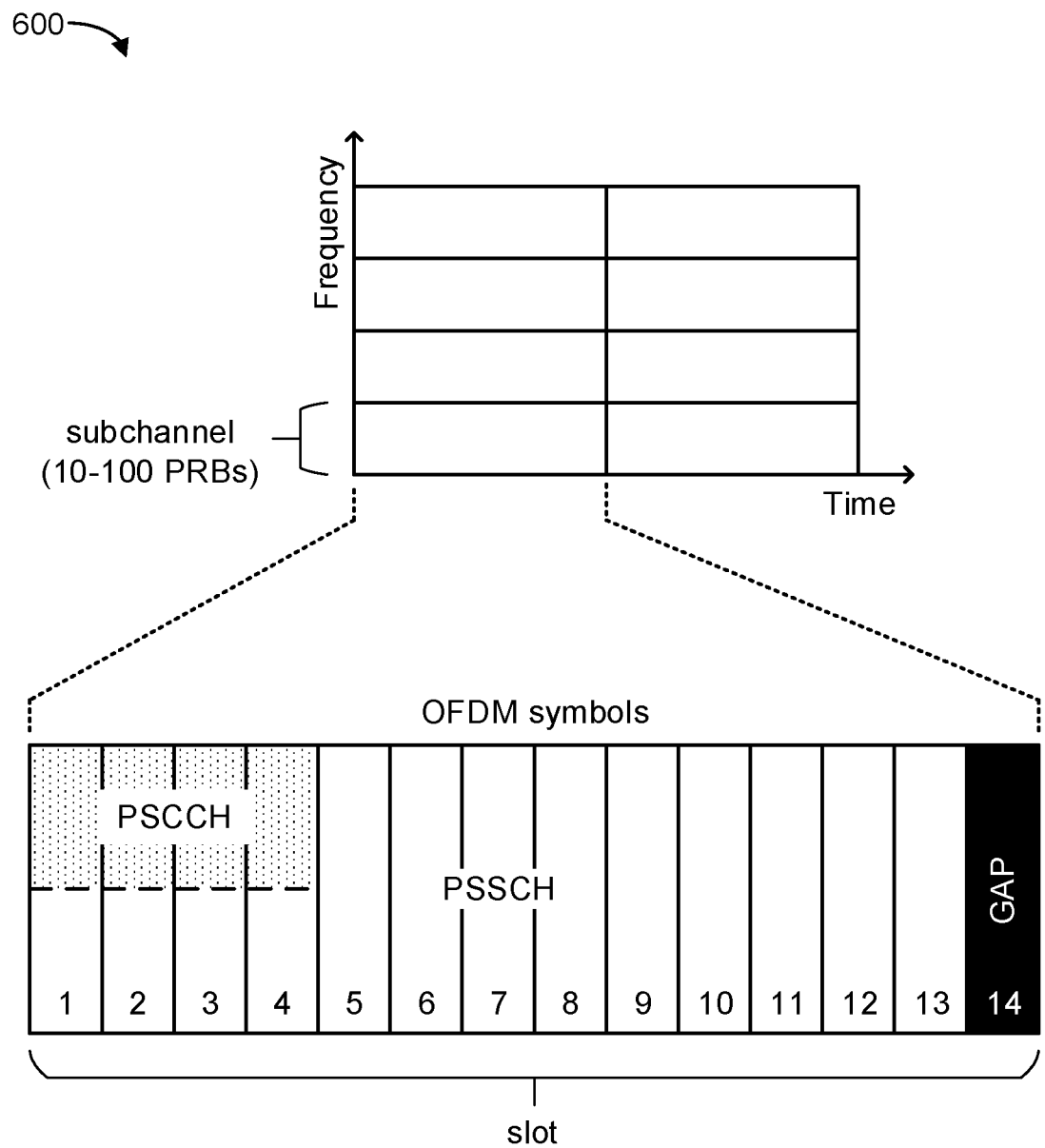
FIG. 6 illustrates time and frequency resources used for sidelink communication.

FIG. 6 illustrates time and frequency resources used for sidelink communication. A time-frequency grid 600 is divided into subchannels in the frequency domain and is divided into time slots in the time domain. Each subchannel comprises a number (e.g., 10, 15, 20, 25, 50, 75, or 100) of physical resource blocks (PRBs), and each slot contains a number (e.g., 14) of OFDM symbols. A sidelink communication can be (pre)configured to occupy fewer than 14 symbols in a slot. The first symbol of the slot is repeated on the preceding symbol for automatic gain control (AGC) settling. The example slot shown in FIG. 4 contains a physical sidelink control channel (PSCCH) portion and a physical sidelink shared channel (PSSCH) portion, with a gap symbol following the PSCCH. PSCCH and PSSCH are transmitted in the same slot.

Sidelink communications take place within transmission or reception resource pools. Sidelink communications occupy one slot and one or more subchannels. Some slots are not available for sidelink, and some slots contain feedback resources. Sidelink communication can be preconfigured (e.g., preloaded on a UE) or configured (e.g., by a base station via RRC). The configuration of FIG. 6 is one example of a sidelink slot configuration, although other configurations are possible (e.g., some sidelink slot configurations may include two or more mini-slots, some sidelink slot configurations may be multiplexed with UL or DL communications, some sidelink slot configurations may include physical sidelink feedback channel (PSFCH) to ACK and/or NACK PSSCH(s) of previous slots, etc.).

In addition to the downlink-based, uplink-based, and downlink-and-uplink-based positioning methods, NR supports various sidelink positioning techniques. For example, link-level ranging signals can be used to estimate the distance between pairs of V-UEs or between a V-UE and a roadside unit (RSU), similar to a round-trip-time (RTT) positioning procedure.

Figure 7:
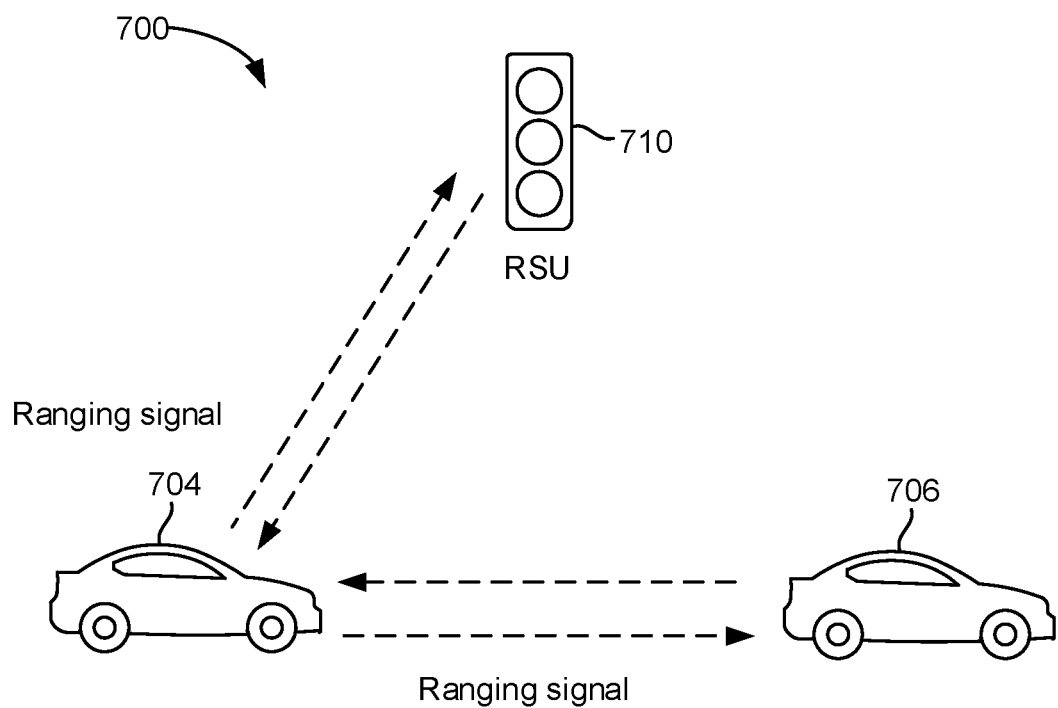
FIG. 7 illustrates an example wireless communication system in which a vehicle user equipment (V-UE) is exchanging ranging signals with a roadside unit (RSU) and another V-UE, according to aspects of the disclosure.

FIG. 7 illustrates an example wireless communication system 700 in which a V-UE 704 is exchanging ranging signals with an RSU 710 and another V-UE 706, according to aspects of the disclosure. As illustrated in FIG. 7, a wideband (e.g., FR1) ranging signal (e.g., a Zadoff Chu sequence) is transmitted by both end points (e.g., V-UE 704 and RSU 710 and V-UE 704 and V-UE 706). In an aspect, the ranging signals may be sidelink positioning reference signals (SL-PRS) transmitted by the involved V-UEs 704 and 706 on uplink resources. On receiving a ranging signal from a transmitter (e.g., V-UE 704), the receiver (e.g., RSU 710 and/or V-UE 706) responds by sending a ranging signal that includes a measurement of the difference between the reception time of the ranging signal and the transmission time of the response ranging signal, referred to as the reception-to-transmission (Rx-Tx) time difference measurement of the receiver.

Upon receiving the response ranging signal, the transmitter (or other positioning entity) can calculate the RTT between the transmitter and the receiver based on the receiver's Rx-Tx time difference measurement and a measurement of the difference between the transmission time of the first ranging signal and the reception time of the response ranging signal (referred to as the transmission-to-reception (Tx-Rx) time difference measurement of the transmitter). The transmitter (or other positioning entity) uses the RTT and the speed of light to estimate the distance between the transmitter and the receiver. If one or both of the transmitter and receiver are capable of beamforming, the angle between the V-UEs 704 and 706 may also be able to be determined. In addition, if the receiver provides its global positioning system (GPS) location in the response ranging signal, the transmitter (or other positioning entity) may be able to determine an absolute location of the transmitter, as opposed to a relative location of the transmitter with respect to the receiver.

As will be appreciated, ranging accuracy improves with the bandwidth of the ranging signals. Specifically, a higher bandwidth can better separate the different multipaths of the ranging signals.

Note that this positioning procedure assumes that the involved V-UEs are time-synchronized (i.e., their system frame time is the same as, or has a known offset relative to, the other V-UE(s)). In addition, although FIG. 7 illustrates two V-UEs, as will be appreciated, they need not be V-UEs, and may instead be any other type of UE capable of sidelink communication.

Figure 8:
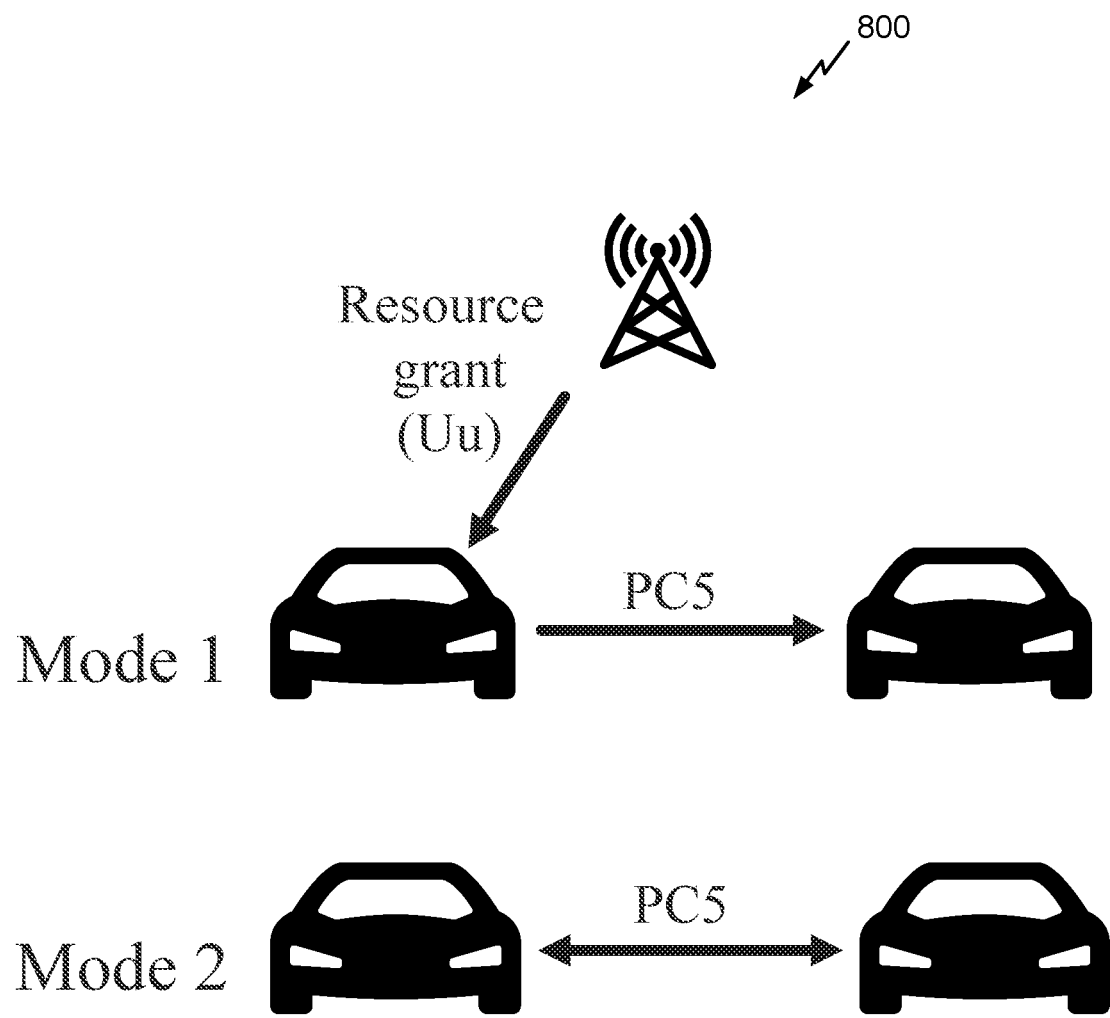
FIG. 8 illustrates sidelink communication scheduling (or resource allocation) schemes in accordance with aspects of the disclosure.

FIG. 8 illustrates sidelink communication scheduling (or resource allocation) schemes 800 in accordance with aspects of the disclosure. In some designs, resource allocation in V2X may be implemented via Mode 1, where gNB assigns Tx resources for sidelink communications through DCI 3_0. In other designs, resource allocation in V2X may be implemented via Mode 2, where a transmitting UE autonomously decides resources for sidelink communications. In some designs, the receiving UE behavior is the same for both Modes 1 and 2.

Referring to FIG. 8, Mode 1 supports dynamic grants (DG), configured grants (CG) type 1, and CG type 2. In some designs, CG type 1 is activated via RRC signaling from gNB. DCI 3_0 is transmitted by gNB to allocation time and frequency resources and indicates transmission timing. In some designs, the modulation and coding scheme (MCS) MCS is up to UE within limit set by gNB. In Mode 2, the transmitting UE performs channel sensing by blindly decoding all PSCCH channels and finds out reserved resources by other sidelink transmissions. The transmitting UE reports available resources to upper layer and upper layer decides resource usage.

5G NR V2X/sidelink communication has been introduced in 3GPP Rel-16/17. For Rel-16/17 V2X/sidelink communication, a number of sidelink signals/physical channels have been specified for transmission either in cellular spectrum (i.e., SL shares spectrum in licensed cellular band) or in dedicated intelligent transportation system (ITS) spectrum. Sidelink positioning will be introduced in 3GPP Rel-18. In some designs, one focus is on sidelink-based high-accuracy positioning for V2X, public safety and commercial use cases.

Sidelink positioning may support both relative and absolute positioning. Relative positioning (e.g., ranging) relates to determination of distance between two UEs. Absolute positioning relates to determination of geographic coordinates of a UE. Sidelink positioning may be performed based on measurement of sidelink positioning reference signals (PRS) transmitted over sidelink. The position estimation can be based on measurements of ToA, TDoA, AoA, RTT, etc., of the SL-PRS. The position estimation accuracy will be largely determined by the SL-PRS bandwidth.

Some sidelink/V2X applications have very high accuracy requirements. For example, sub-meter level accuracy may be needed to support vehicle maneuver coordination. Therefore, very large bandwidth (e.g., ~100 MHz or higher) PRS transmission may be used. Current ITS spectrum for V2X may not have such wide band available. For example, depending on the regions, there may be only 20-30 MHz ITS bandwidth available for V2X. In some designs, transmitting sidelink PRS over 20-30 MHz bandwidth may not provide a required positioning accuracy.

One possibility is to transmit SL-PRS in unlicensed spectrum. For example, UN-II 3 or UN-II 5 has large bandwidth available. However, unlicensed spectrum may be shared by other technologies (e.g., Wi-Fi), and access to the unlicensed spectrum may be subject to regulatory requirements. For example, one requirement in unlicensed spectrum may be a contention-based protocol such as listen before talk (LBT), whereby a device has to perform sensing (listen) to clear the channel before that device can transmit (talk).

For most LBT, a device generally measures energy and determines to transmit if the measured energy is below a threshold. For example, category (CAT) 1 LBT includes LBT without sensing (can transmit immediately; similar to Type 2c channel access in NR-U). In another example, CAT 2 LBT includes LBT with energy sensing but without random back-off (can transmit if sensed energy in a certain period is below a threshold; similar to Type 2a/2b channel access in NR-U). In another example, CAT 4 LBT includes LBT with random back-off with a contention window of variable size (can transmit if sensed energy in a contention window is below a threshold; similar to Type 1 channel access in NR-U). Note that, CAT 1/2 LBT is allowed only in certain scenarios When SL-PRS is transmitted in unlicensed spectrum, the transmission opportunity may be uncertain. This is due to the uncertainty from LBT—i.e., a transmitter can only transmit when LBT succeeds. Besides PRS, positioning assistance message may also be needed in some designs. A positioning assistance message may be sent prior to and/or post SL PRS transmission, to carry SL positioning related configuration (e.g., PRS configuration, etc.), SL positioning related measurements (ToA, etc.), etc. In some designs, a positioning assistance message may also be sent over sidelink (between UEs), but can be in licensed or ITS band (i.e., the same as regular sidelink transmissions)

In some designs, SL positioning may be performed between two or more UEs. For example, in case of RTT-based positioning, UE1 transmits PRS to UE2, UE2 also transmits PRS to UE1, and the range between the two UEs may be calculated based on round trip time of PRSs. In another example, in sidelink positioning with RSU participation (a special UE, which may be stationary), multiple UEs may perform positioning based on PRS transmission from the RSU and the UE.

One option to reduce uncertainty in SL-PRS transmission in unlicensed spectrum is to enable sharing of channel occupancy (CO, or COT). For example, UE1 performs channel access (e.g., CAT 4 LBT) and transmits PRS upon success of the channel access. UE2 transmits PRS upon detection of UE1's PRS transmission (UE1 initiated a COT; which is shared with UE2). In some designs, at least CAT 4 LBT can be exempted at UE2 for its PRS transmission in the COT sharing manner (e.g., a gap between the two PRS transmissions no larger than a threshold (e.g., 25 us) is allowed) (e.g., UE2 performs CAT 1 or 2 LBT).

In PRS transmission, the UE initiating the COT is referred to as initiator (e.g., UE1), the UE(s) sharing the COT following initiator's transmission is referred to as responder (e.g., UE2). In a SL positioning performance, there may be one initiator, and one or multiple responders.

SL PRS transmission in unlicensed spectrum can be COT sharing based, as noted above. Two or more UEs may form a group for SL PRS transmission (e.g., handshake is performed for UE grouping). The UEs in the group may agree on or be indicated a time resource location (t1) that PRS transmission may start. Transmission of PRS (starting from t1) may be subject to LBT. One of the UEs in the group (initiator) may perform (CAT 4) LBT towards transmitting PRS at t1. If initiator's LBT is not successful at/prior to t1 (e.g., channel is occupied by others), the initiator may keep sensing the channel and transmit PRS later when LBT succeeds—this later time (t1+t_delta1) is unknown to responder(s). Other UEs in the group (responders) may blindly detect initiator PRS starting from t1, to determine whether and when a PRS CO (or COT) is initiated by the initiator UE. If initiator PRS is detected, the responder UE(s) may share the PRS COT to transmit its PRS. CAT 4 LBT may be exempted at responder UE if it shares the COT (e.g., just do CAT 1 or CAT 2 LBT).

In this scenario, a problem arises due to the uncertainty of PRS transmission in unlicensed spectrum. For example, the responder UE keep trying to detect SL PRS from initiator, which is not optimal in terms of power consumption. Also, the responder UE may not be able to prepare the SL PRS for transmission back to the initiator UE until the responder UE has detected initiator's PRS—in this case, the turnaround time at the responder UE will then be very tight (due to the time uncertainty).

Aspects of the disclosure are directed to a sidelink PRS pattern for a sidelink estimation procedure, whereby the sidelink PRS pattern including at least one PRS transmission occasion for each of a group of UEs on a shared communication medium. In contrast to the scenario described above where the responder UE's PRS transmission occasion is only ascertainable once the initiator UE's PRS is detected, the use of a sidelink PRS pattern may provide more certainty in terms of PRS transmission occasion location. Such aspects may provide various technical advantages, such as reduction to power consumption, and streamlining the PRS preparation at the responder UE(s).

Figure 9:
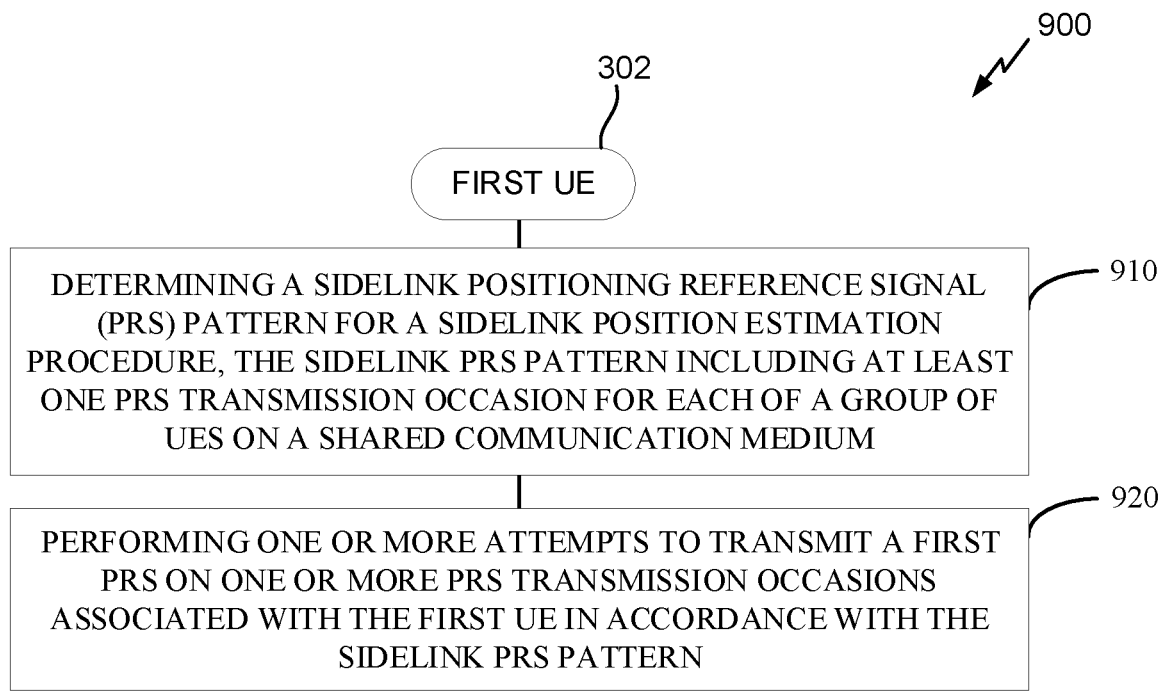
FIG. 9 illustrates an exemplary process of wireless communication, according to aspects of the disclosure.

FIG. 9 illustrates an exemplary process 900 of wireless communication, according to aspects of the disclosure. In an aspect, the process 900 may be performed by a first UE, such as UE 302. In particular, the first UE corresponds to an initiator UE (e.g., a sole initiator UE associated with a UE group, or one of multiple opportunistic initiator UEs associated with the UE group).

Referring to FIG. 9, at 910, the first UE (e.g., processor(s) 332, sidelink resource component 342, etc.) determines a sidelink positioning reference signal (PRS) pattern for a sidelink position estimation procedure, the sidelink PRS pattern including at least one PRS transmission occasion for each of a group of UEs on a shared communication medium. For example, the shared communication medium may correspond to unlicensed spectrum (e.g., on which other traffic may be transmitted such as Wi-Fi, etc.). In an example, each PRS transmission occasion may correspond to a time-frequency (T-F) resource, although the size of each PRS transmission occasion need not be the same, as will be described below in more detail. A means for performing the determination of 910 may include processor(s) 332, sidelink resource component 342, etc., of UE 302.

Referring to FIG. 9, at 920, the first UE (e.g., transmitter 314 or 324, receiver 312 or 322, processor(s) 332, sidelink resource component 342, etc.) performs one or more attempts to transmit a first PRS on one or more PRS transmission occasions associated with the first UE in accordance with the sidelink PRS pattern. For example, the one or more attempts at 920 may be subject to a contention-based protocol (e.g., LBT), as will be described below in more detail. A means for performing the transmission of 920 may include transmitter 314 or 324, receiver 312 or 322, processor(s) 332, sidelink resource component 342, etc., of UE 302.

Figure 10:
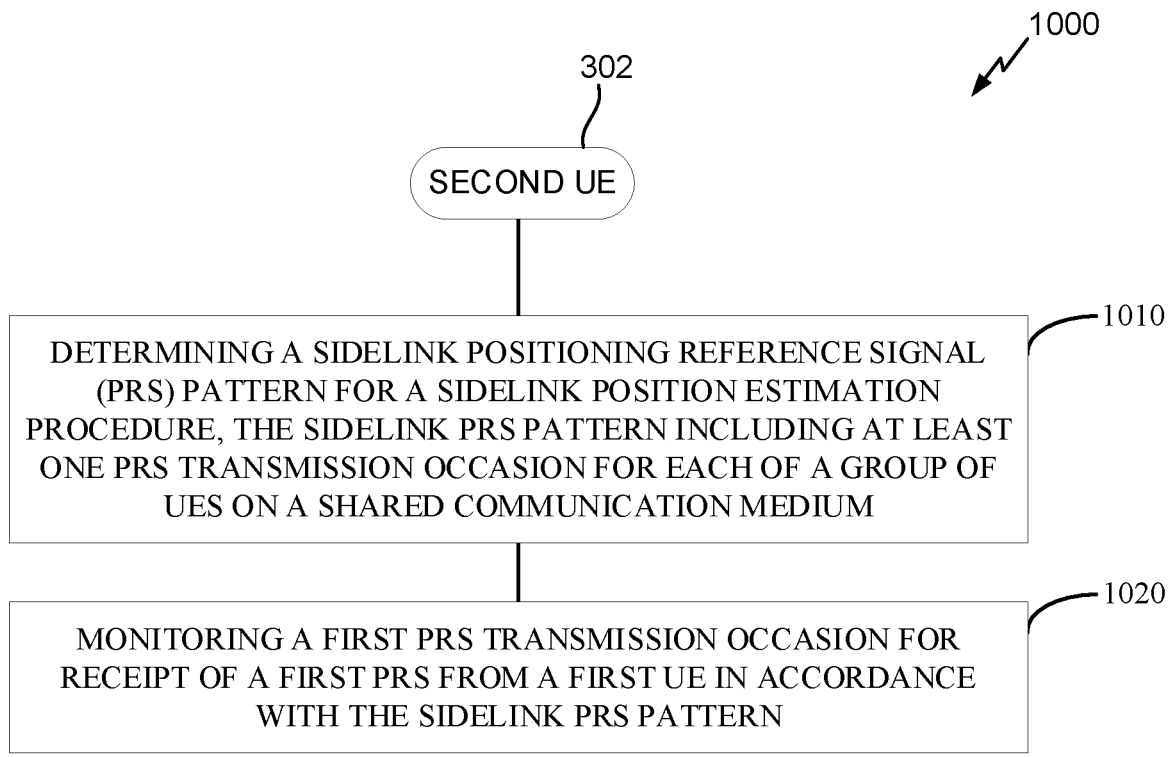
FIG. 10 illustrates an exemplary process of wireless communication, according to aspects of the disclosure.

FIG. 10 illustrates an exemplary process 1000 of wireless communication, according to aspects of the disclosure. In an aspect, the process 1000 may be performed by a second UE, such as UE 302. In particular, the second UE corresponds to a responder UE (e.g., a UE attempting to respond with SL PRS in association with a COT that is initiated by an initiator UE of the UE group) that is monitoring for PRS from an initiator UE or an 'intervening' responder UE, as will be described below in more detail. However, in some aspects, the COT may be canceled due to lack of PRS detection, which may optionally transition the second UE from a responder UE to an opportunistic initiator UE (e.g., to initiate a new COT).

Referring to FIG. 10, at 1010, the second UE (e.g., processor(s) 332, sidelink resource component 342, etc.) determines a sidelink positioning reference signal (PRS) pattern for a sidelink position estimation procedure, the sidelink PRS pattern including at least one PRS transmission occasion for each of a group of UEs on a shared communication medium. For example, the shared communication medium may correspond to unlicensed spectrum (e.g., on which other traffic may be transmitted such as Wi-Fi, etc.). In an example, each PRS transmission occasion may correspond to a time-frequency (T-F) resource, although the size of each PRS transmission occasion need not be the same, as will be described below in more detail. A means for performing the determination of 1010 may include processor(s) 332, sidelink resource component 342, etc., of UE 302.

Referring to FIG. 10, at 1020, the second UE (e.g., receivers 312 or 322, processor(s) 332, sidelink resource component 342, etc.) monitors a first PRS transmission occasion for receipt of a first PRS from a first UE in accordance with the sidelink PRS pattern. As noted above, the one or more attempts at 920 may be subject to a contention-based protocol (e.g., LBT), and as such reception of the first PRS at 1020 may not be guaranteed. A means for performing the monitoring of 1020 may include receivers 312 or 322, processor(s) 332, sidelink resource component 342, etc., of UE 302.

Referring to FIGS. 9-10, in some designs, two or more UEs may form a positioning group based on a handshake procedure (e.g., based on a handshake procedure, which is performed based on message exchange between the UEs). In one example, two UEs are grouped together for PRS measurements for sidelink ranging. In another example, one RSU and one or multiple UEs are grouped together, where each of the UEs may intend to range itself with respect to the RSU (e.g., RSU may be stationary and has known geographic location). In some designs, the sidelink PRS pattern may be associated with a starting location and duration, and may include PRS transmission occasions for each of the UEs in the group. In some designs, there are multiple PRS transmission occasions for each UE in the sidelink PRS pattern. In some designs, the sidelink PRS pattern may be determined by one of the UEs and announced during group formation. In some designs, a UE in the group may perform channel access prior to its respective PRS transmission occasion. In some designs, the channel access may be an energy sensing-based LBT procedure, PRS detection-based approach, or a hybrid LBT plus PRS detection approach, as will be described in more detail below.

Referring to FIGS. 9-10, in some designs, the group of UEs includes the first UE and at least one other UE including the second UE, the sidelink PRS pattern includes N PRS transmission occasions associated with the first UE, and the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE. An example of this aspect is depicted in FIG. 11.

Figure 11:
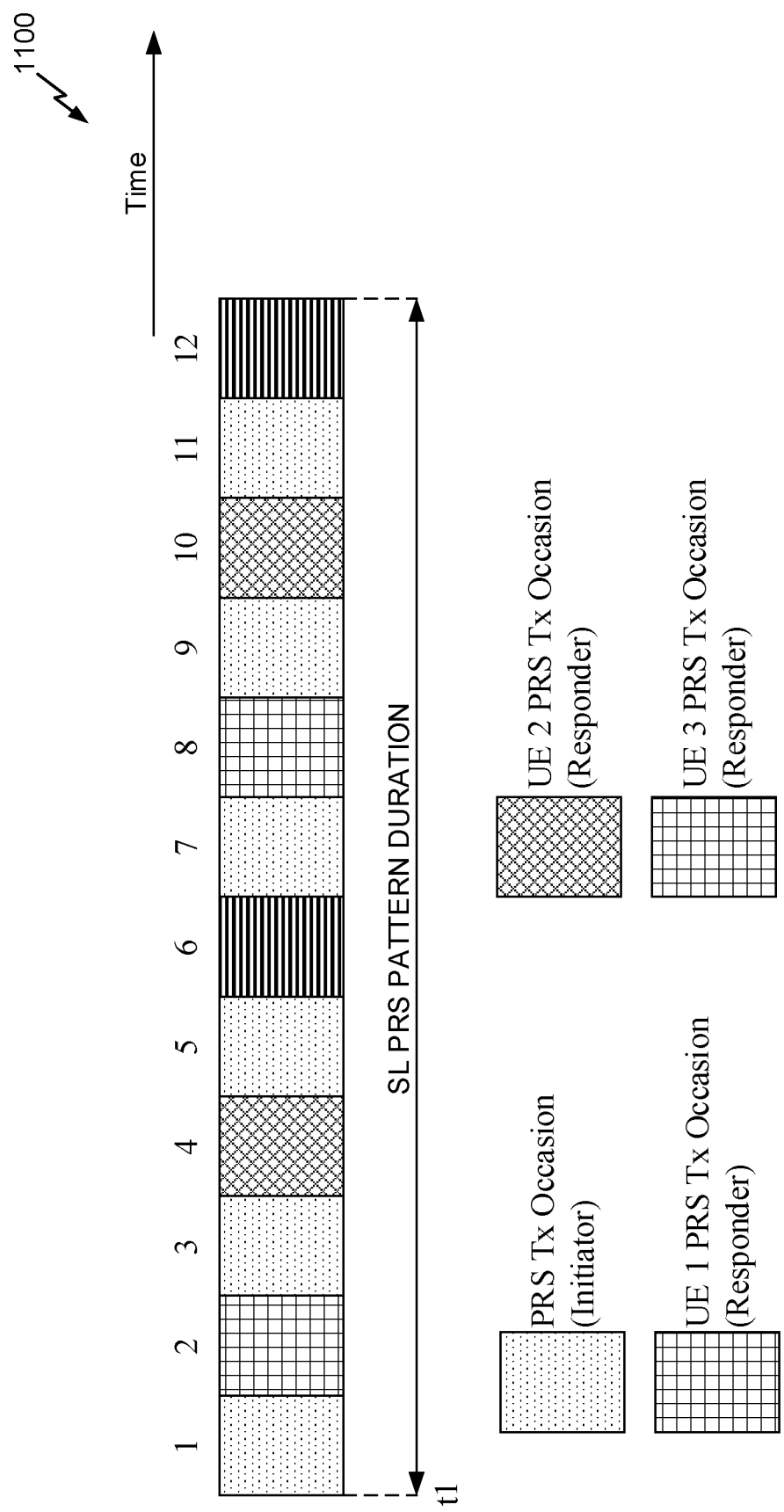
FIG. 11 illustrates a sidelink PRS pattern in accordance with aspects of the disclosure.

FIG. 11 illustrates a sidelink PRS pattern 1100 in accordance with aspects of the disclosure. In FIG. 11, the UE group includes X UEs (in this case, X=4 UEs, counting an initiator UE plus responder UEs 1-3), and the sidelink PRS pattern includes 12 total PRS transmission occasions, with 6 PRS transmission occasions (N=6) being allocated to an initiator UE and another 6 PRS transmission occasions (N=6) being split being responder UEs 1-3. In FIG. 11, each responder UE's PRS transmission occasion follows a PRS transmission occasion for the initiator UE. The responder UEs 1-3 each have the same number M of PRS transmission occasions (i.e., M=2 PRS transmission occasions per responder UE). So, there are M*(X-1)=N PRS transmission occasions (in this case, N=2×3=6) for the initiator UE. The total number of PRS transmission occasions is M*(X-1)+ M*(X-1) (in this case, 2×3+2×3=12).

Referring to FIG. 11, in some designs, a time location of the sidelink PRS pattern may be indicated to the UE group. For example, the sidelink PRS pattern may be determined during group formation and indicated to the UEs (e.g., by the initiator UE). In some designs, the time location includes a starting location and duration of the sidelink PRS pattern. In some designs, PRS occasion allocation in the sidelink PRS pattern may also be indicated to the UEs as part of the pattern information. In some designs, the initiator UE performs channel access towards transmitting PRS in the initiator UE's PRS transmission occasions. For example, the initiator UE may perform CAT 4 LBT to transmit its SL PRS (e.g., Type 1 channel access). In some designs, the initiator UE may transmit PRS if the initiator UE succeeds LBT/ channel access (which will also start a COT). In some designs, the initiator UE can only transmit in the initiator UE's PRS occasions. In some designs, a responder UE may detect PRS in the initiator PRS occasion(s). The detection may indicate tell initiator PRS has been transmitted (so, whether a COT is initiated). A responder UE may detect initiator PRS only in the initiator PRS occasion prior to its respective PRS occasion (e.g., in FIG. 11, this means UE 1 will attempt to detect initiator PRS in PRS transmission occasion 1 and (optionally) PRS transmission occasion 7, UE 2 will attempt to detect initiator PRS in PRS transmission occasion 3 and (optionally) PRS transmission occasion 9, and UE 3 will attempt to detect initiator PRS in PRS transmission occasion 5 and (optionally) PRS transmission occasion 11). In some designs, if initiator PRS has been detected, the responder UE may transmit its PRS in the subsequent PRS occasion (which is the responder UE's PRS occasion). In some designs, the responder UE may transmit PRS based on CAT 1 LBT (Type 2c channel access) or CAT 2 LBT (type 2a/2b channel access) (so assumption is that the responder UE's PRS transmission is in COT sharing manner).

Figure 12:
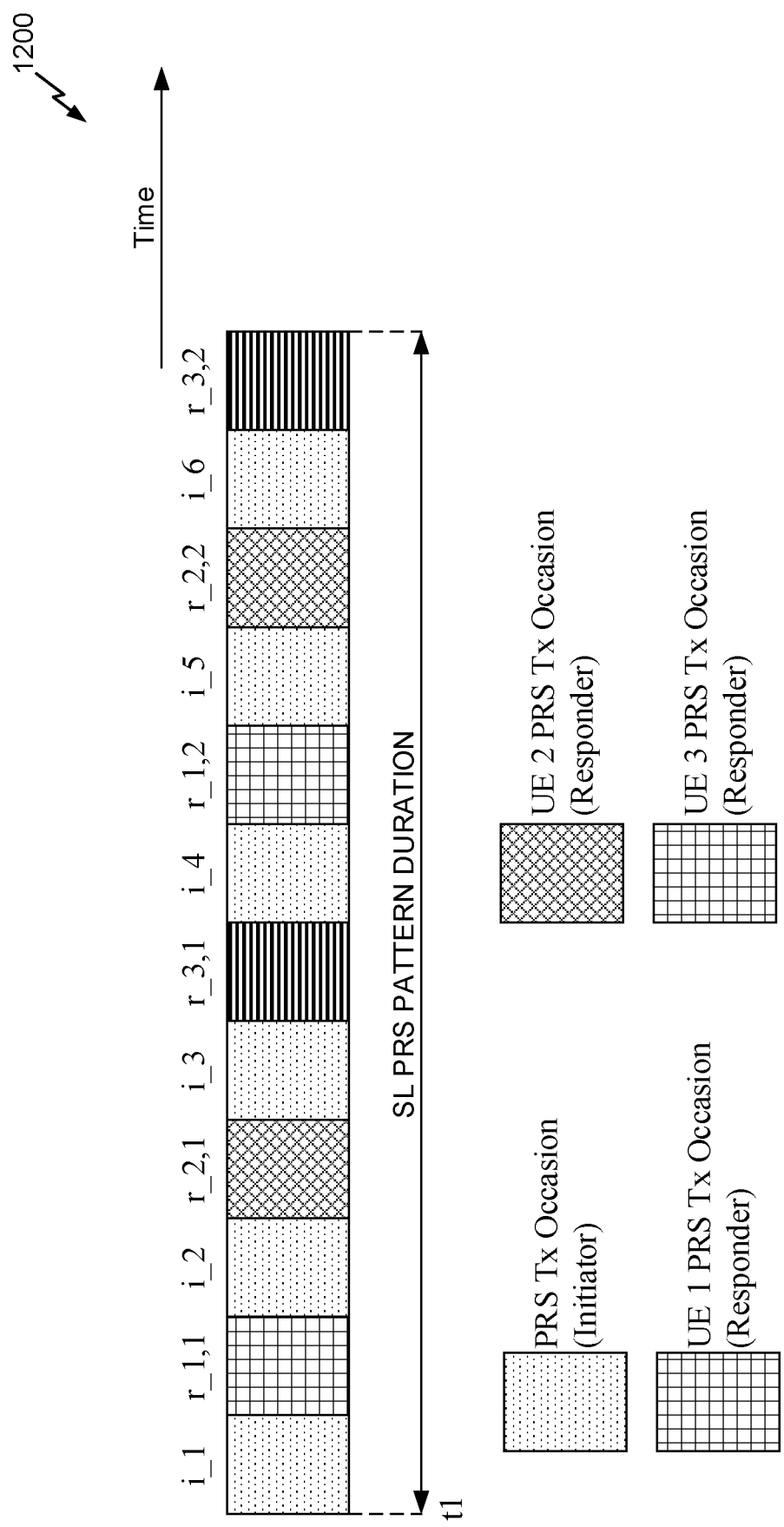
FIG. 12 illustrates a sidelink PRS pattern in accordance with aspects of the disclosure.

FIG. 12 illustrates a sidelink PRS pattern 1200 in accordance with aspects of the disclosure. The sidelink PRS pattern 1200 is similar to the sidelink PRS pattern 1100 of FIG. 11, except that the sidelink PRS pattern 1200 labels the PRS transmission occasions in the format of [Transmitter]_ PRSTxOccasion #, whereby i denotes the initiator UE, r_1 denotes UE 1, r_2 denote UE 2 and r_3 denotes UE 3.

Referring to FIG. 12, four UEs (e.g., one UE-type RSU and three vehicle UEs) form a positioning group. The RSU indicates a PRS transmission occasion pattern starting from t1 (RSU is initiator). The initiator performs Type 1 channel access for its PRS transmission. Assume that the initiator fails the channel access for PRS transmission in its first PRS occasion (i_1) but succeeds channel access for PRS transmission in its second PRS occasion (i_2) in the occasion pattern, the initiator transmits PRS in its second PRS occasion (i_2). The responder UE 1 is detecting initiator PRS in the initiator's first PRS occasion (i_1). In this case, the responder UE 1 detects no PRS (initiator does not transmit due to LBT), so the responder UE 1 will not transmit PRS in its first PRS occasion (r_1,1). The responder UE 2 is detecting initiator PRS in the initiator's second PRS occasion (i_2). The responder UE 2 detects the initiator PRS in that occasion. The responder UE 2 thus transmits its PRS in its first PRS occasion (r_2,1). The UE2's transmission may follow a type 2 channel access (CAT1 or 2 LBT). The initiator UE transmits PRS again in its 3r d PRS occasion (i_3). This transmission is to keep channel occupied (the transmission may be subject to type 2 channel access). Responder UE 3 detects initiator's PRS in i_3 and may transmit its PRS in r_3,1 if initiator PRS is detected (similar to UE 2's behavior, whereby the COT). The initiator UE stops PRS transmission if all responder UEs have transmitted PRS. In this example, PRS occasions i_5 and onward will not be used by the group of UEs.

Referring to FIGS. 9-10, in some designs, the group of UEs comprises the first UE and at least one other UE including the second UE, the sidelink PRS pattern includes N PRS transmission occasions associated with the first UE, and each of the N PRS transmission occasions is paired with one respective PRS transmission occasion associated with each UE among the at least one other UE. An example of this aspect is depicted in FIG. 13.

Figure 13:
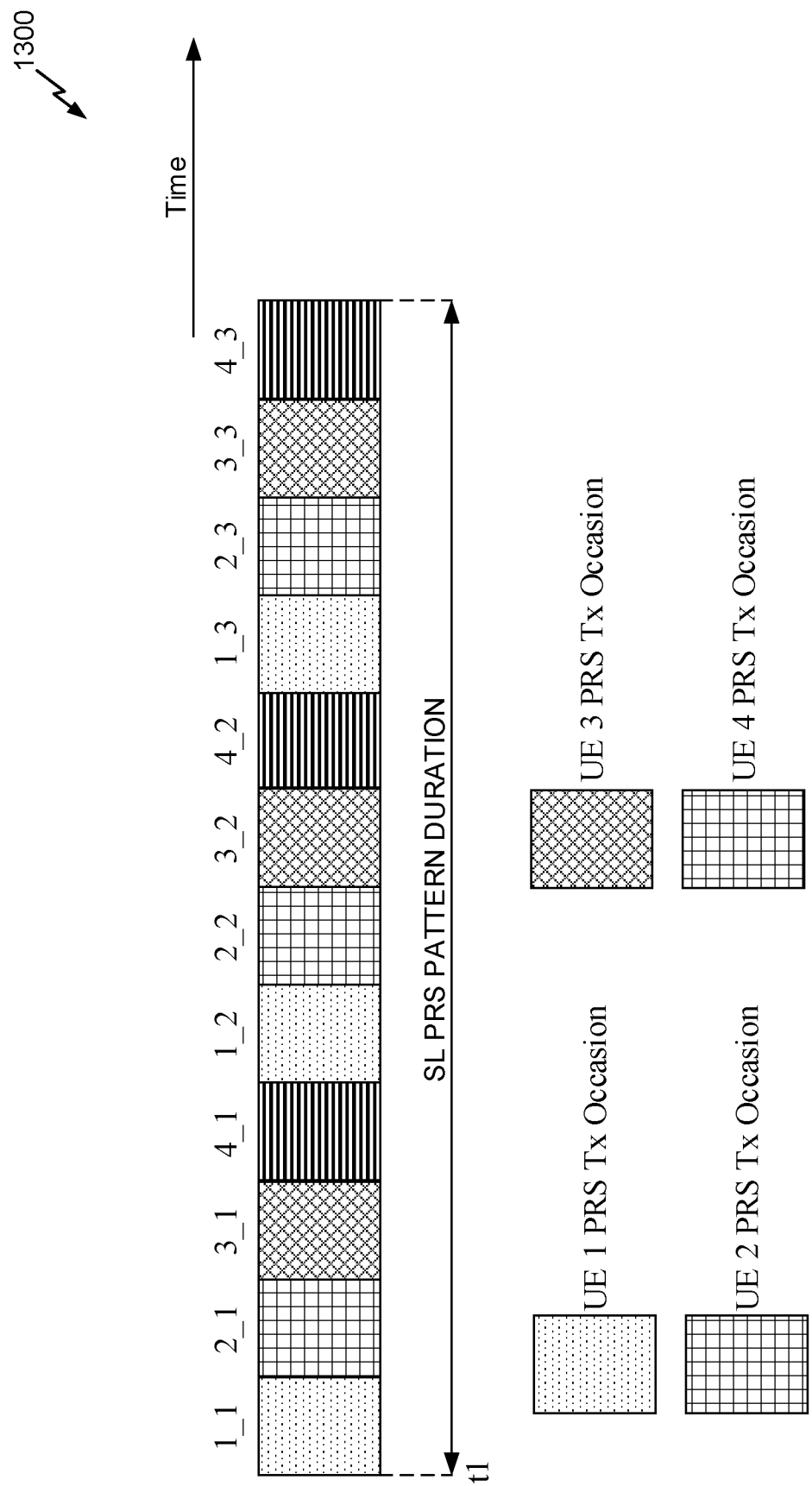
FIG. 13 illustrates a sidelink PRS pattern in accordance with aspects of the disclosure.

FIG. 13 illustrates a sidelink PRS pattern 1300 in accordance with aspects of the disclosure. In FIG. 13, the UE group includes X UEs (in this case, X=4 UEs, including UEs 1-4), and the sidelink PRS pattern includes 12 total PRS transmission occasions, with 3 PRS transmission occasions (N=3) being allocated to each of UEs 1-4. The sidelink PRS pattern 1300 labels the PRS transmission occasions in the format of [UE #]_PRSTxOccasion #.

Referring to FIG. 13, in some designs, the sidelink PRS pattern 1300 may be implemented similarly to the sidelink PRS patterns 1100-1200 of FIGS. 11-12, with the UE 1 is designated as the initiator UE (e.g., during group formation). In this case, PRS transmission by UE 1 will start a COT, and responder UEs 2-4 may detect initiator PRS in the initiator PRS occasion, and perform CAT1 or CAT2 LBT towards transmitting PRS in each own PRS transmission occasion if initiator PRS has been detected.

Referring to FIG. 13, in other designs, any UE in the UE group is capable of opportunistically taking the role of an initiator UE (e.g., any UE may start COT if there is no active COT). For example, each UE performs channel access/LBT (e.g., CAT4) for PRS transmission towards its own PRS occasion, and each UE may also detect PRS that is transmitted by other UEs in other UEs' PRS occasions. If a UE succeeds channel access (e.g., type 1 CA/CAT4 LBT), the UE transmits PRS in its own PRS occasion. If a UE detects PRS in the PRS occasion prior to its own PRS occasion, the UE may determine that a COT for SL PRS transmission has been initiated. The UE may transmit SL PRS in its own PRS occasion, after performing a successful type 2c (CAT1 LBT) or type 2a/2b channel access (CAT2 LBT). With respect to the sidelink PRS pattern 1300, each UE's PRS transmission occasion occurs periodically; all UEs have equal number (>1) PRS occasions. An example (X UEs form a positioning group): there are M PRS transmission occasions for each UE in the PRS occasion pattern; so, there are M*X PRS transmission occasions in total (i.e., M=3 and N=4, for 3×4=12 PRS occasions in the sidelink PRS pattern 1300).

Referring to FIG. 13, in an example, assume 4 UEs form a positioning group. One of the UEs (e.g., UE 1) indicates a PRS transmission occasion pattern starting from t1. UE 1 performs channel access (e.g., type 1/CAT4 LBT) towards transmitting PRS in the first PRS occasion (1_1). In this case, assume that UE1 fails the channel access (unable to pass LBT for SL PRS transmission in first PRS occasion). UE 2 detects UE 1's PRS in the UE 1's first PRS occasion (1_1), and detects no PRS (UE 1 did not transmit). Subsequently or in parallel, UE 2 may perform channel access (e.g., type 1/CAT 4 LBT) towards transmitting PRS in the second PRS occasion (2_1). Further assume that UE 3 is the first successful channel access in the group of UEs at PRS occasion 3_2. UE 3 transmits SL PRS in PRS transmission occasion 3_2 (this transmission will also start a COT for sharing). UE 4 may detect the PRS (successfully) and transmit its PRS in PRS occasion 4_2. Here, UE 4 may transmit its PRS after performing a type 2a/2b/2c channel access (CAT1 or 2 LBT). Similarly, UE 1 and UE 2 transmit PRS at PRS occasions 1_3 and 2_3, respectively, following UE 4's PRS transmission at 4_2. PRS transmission stops after all UEs in the group have transmitted PRS.

Referring to FIGS. 9-10, in some designs, each PRS transmission occasion may have one or more OFDM symbols. For example, For example, a PRS transmission occasion may have 6 OFDM symbols. In some designs, for a scenario where a UE is designated as initiator UE (e.g., during group formation), the initiator UE's PRS occasion may be different (e.g., longer) than a responder UE's PRS occasion duration. For example, initiator UE's PRS occasion may have 6 OFDM symbols (a greater number of OFDM symbols may facilitate the PRS detection by responder UEs), but duration of responder UE's PRS occasion may be shorter (e.g., 2 OFDM symbols). This differentiation in terms of PRS transmission occasion duration may be implemented with respect to any of the scenarios described above with respect to FIGS. 11-13.

Referring to FIGS. 9-10, in some designs, the duration(s) of PRS transmission occasions may be (pre)configured. Alternatively, the duration(s) of PRS transmission occasions can be determined during UE group formation and indicated to UEs (e.g., by the initiator UE). In some designs, the duration(s) of PRS transmission occasions may be in a minimum unit of OFDM symbol, or slot, etc. In some designs, for a respective UE's SL PRS transmission occasion, the UE may transmit PRS (only PRS), in one or multiple OFDM symbols. Alternatively, the UE may transmit PRS and other signal(s) (e.g., a control signal associated with the SL PRS) in its respective PRS transmission occasion.

Referring to FIGS. 9-10, in some designs, though the SL PRS transmissions may still be subject to LBT, the PRS transmission is more deterministic because a UE knows when to transmit/receive (or expect to transmit/receive) the SL PRS from another UE. As a result, for a UE transmitting SL PRS, the candidate time resource locations for its SL PRS transmission are known a priori, so the UE has a faster turnaround and can better prepare for PRS transmission (e.g., generate PRS waveform, etc.). Also, for a UE monitoring SL PRS from other UEs, the candidate time resource locations for those PRS are also known, so the blind detection is limited to a subset of time resources, which will facilitate UE's PRS detection and reduce power consumption. Some of the above-noted aspects facilitate a COT sharing framework, which will reduce the uncertainty for PRS transmission in unlicensed spectrum.

Referring to FIGS. 9-10, in some designs (e.g., with respect to the sidelink PRS patterns of any of FIGS. 11-13), in response to a successful attempt to transmit the first PRS on a first PRS transmission occasion, the first UE may monitor at least a second PRS transmission occasion for receipt of a second PRS from a second UE in accordance with the sidelink PRS pattern. For example, the monitoring for the second PRS may be performed for an RTT measurement, where RTT is measured based on a combination of the first PRS and the second PRS. In some designs, if the second PRS is not received on the second PRS transmission occasion, one or more attempts to transmit a third PRS on one or more additional PRS transmission occasions associated with the first UE in accordance with the sidelink PRS pattern may be performed by the first UE. In some designs, the first UE's attempt to transmit the third SL PRS can be either based on a Type 2 channel access (e.g., when the transmission is considered as part of the COT the first UE has initiated), or based on a Type 1 channel access (e.g., when the transmission is considered to be starting a new COT). In an aspect, assume the second PRS is received from the second UE on the second PRS transmission occasion. In an example, the second PRS is transmitted in accordance with a contention-based protocol, such as Type 2 channel access (e.g., CAT 1/2 LBT). As noted above, duration of the first PRS transmission occasion may be different (e.g., longer) than a duration of the second PRS transmission occasion, particular for a scenario where the first UE corresponds to a preconfigured initiator UE (e.g., rather than an opportunistic initiator UE for scenarios where any UE may start COT).

Referring to FIGS. 9-10, in some designs as noted above (e.g., with respect to the sidelink PRS patterns of any of FIGS. 11-13), a time location associated with the sidelink PRS pattern is determined and shared among the group of UEs during formation of the group of UEs, or the time location includes a starting time and duration of the sidelink PRS pattern, or the sidelink PRS pattern comprises an allocation of sidelink PRS transmission occasions to the group of UEs, or a duration of each PRS transmission occasion of the sidelink PRS pattern is configured during formation of the group of UEs, or any combination thereof.

Referring to FIGS. 9-10, in some designs as noted above, the one or more attempts to transmit the first PRS by the first UE are performed in accordance with a contention-based protocol (e.g., Type 1 channel access.). As noted above, for a 'preconfigured' initiator UE, the first UE may be an initiator UE, with a channel occupancy time (COT) for the sidelink position estimation procedure being initiated after a successful attempt to transmit the first PRS on the first PRS transmission occasion, whereby an unsuccessful attempt to transmit PRS by a second UE or a subsequent UE cancels the COT. In other designs, if 'opportunistic' initiator UEs are supported, any UE in the group of UEs operates as an initiator UE upon successful transmission of a respective PRS from the respective UE when no channel occupancy time (COT) for the sidelink position estimation procedure is active.

Referring to FIGS. 9-10, in some designs as noted above (e.g., with respect to the sidelink PRS patterns of any of FIGS. 11-13), the second UE (e.g., responder UE) may selectively attempt to transmit a second PRS on a second PRS transmission occasion associated with the second UE in accordance with the sidelink PRS pattern based on whether the first PRS is received from the first UE on the first PRS occasion. In some designs, the second PRS may be transmitted by the second UE on the second PRS transmission occasion in accordance with a contention-based protocol (e.g., Type 2 channel access). In some designs as noted above, the second PRS transmission occasion may be different (e.g., shorter) than the first PRS transmission occasion (e.g., if the first UE corresponds to a preconfigured initiator UE).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a first user equipment (UE), comprising: determining a sidelink positioning reference signal (PRS) pattern for a sidelink position estimation procedure, the sidelink PRS pattern including at least one PRS transmission occasion for each of a group of UEs on a shared communication medium; and performing one or more attempts to transmit a first PRS on one or more PRS transmission occasions associated with the first UE in accordance with the sidelink PRS pattern.

Clause 2. The method of clause 1, wherein the group of UEs comprises the first UE and at least one other UE including a second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 3. The method of any of clauses 1 to 2, wherein the group of UEs comprises the first UE and at least one other UE including a second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 4. The method of any of clauses 1 to 3, further comprising: monitoring, in response to a successful attempt to transmit the first PRS on a first PRS transmission occasion, at least a second PRS transmission occasion for receipt of a second PRS from a second UE in accordance with the sidelink PRS pattern; performing, if the second PRS is not received on the second PRS transmission occasion, one or more attempts to transmit a third PRS on one or more additional PRS transmission occasions associated with the first UE in accordance with the sidelink PRS pattern; and monitoring, in response to a successful attempt to transmit the third PRS on a third PRS transmission occasion, at least a fourth PRS transmission occasion for receipt of a fourth PRS from the second UE in accordance with the sidelink PRS pattern.

Clause 5. The method of clause 4, wherein the second PRS is received from the second UE on the second PRS transmission occasion.

Clause 6. The method of clause 5, wherein the second PRS is transmitted in accordance with a contention-based protocol.

Clause 7. The method clause 6, wherein the contention-based protocol corresponds to Type 2 channel access.

Clause 8. The method of any of clauses 4 to 7, wherein a duration of the first PRS transmission occasion is different than a duration of the second PRS transmission occasion.

Clause 9. The method of any of clauses 1 to 8, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 10. The method of any of clauses 1 to 9, wherein the one or more attempts to transmit the first PRS are performed in accordance with a contention-based protocol.

Clause 11. The method clause 10, wherein the contention-based protocol corresponds to Type 1 channel access.

Clause 12. The method of any of clauses 1 to 11, wherein the first UE is an initiator UE, with a channel occupancy time (COT) for the sidelink position estimation procedure being initiated after a successful attempt to transmit the first PRS on the first PRS transmission occasion.

Clause 13. The method of clause 12, wherein an unsuccessful attempt to transmit PRS by a second UE or a subsequent UE cancels the COT.

Clause 14. The method of any of clauses 1 to 13, wherein any UE in the group of UEs operates as an initiator UE upon successful transmission of a respective PRS from the respective UE when no channel occupancy time (COT) for the sidelink position estimation procedure is active.

Clause 15. The method of any of clauses 1 to 14, wherein each PRS transmission occasion of the sidelink PRS pattern includes one or more orthogonal frequency-division multiplexing (OFDM) symbols.

Clause 16. The method of any of clauses 1 to 15, wherein only the first PRS is transmitted by the first UE on the first PRS transmission occasion, or wherein the first PRS and one or more other signals are transmitted by the first UE on the first PRS transmission occasion.

Clause 17. The method of clause 16, wherein the one or more other signals comprise a control signal associated with the first PRS.

Clause 18. A method of operating a second user equipment (UE), comprising: determining a sidelink positioning reference signal (PRS) pattern for a sidelink position estimation procedure, the sidelink PRS pattern including at least one PRS transmission occasion for each of a group of UEs on a shared communication medium; and monitoring a first PRS transmission occasion for receipt of a first PRS from a first UE in accordance with the sidelink PRS pattern.

Clause 19. The method of clause 18, wherein the group of UEs comprises the first UE and at least one other UE including the second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 20. The method of any of clauses 18 to 19, wherein the group of UEs comprises the first UE and at least one other UE including the second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 21. The method of any of clauses 18 to 20, further comprising: selectively attempting to transmit a second PRS on a second PRS transmission occasion associated with the second UE in accordance with the sidelink PRS pattern based on whether the first PRS is received from the first UE on the first PRS occasion.

Clause 22. The method of clause 21, wherein the second PRS is transmitted by the second UE on the second PRS transmission occasion.

Clause 23. The method of clause 22, wherein the second PRS is transmitted in accordance with a contention-based protocol.

Clause 24. The method of clause 23, wherein the contention-based protocol corresponds to Type 2 channel access.

Clause 25. The method of any of clauses 21 to 24, wherein a duration of the first PRS transmission occasion is different than a duration of the second PRS transmission occasion.

Clause 26. The method of any of clauses 18 to 25, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 27. The method of any of clauses 18 to 26, wherein the first UE is an initiator UE, with a channel occupancy time (COT) for the sidelink position estimation procedure being initiated after a successful attempt to transmit the first PRS on the first PRS transmission occasion.

Clause 28. The method of any of clauses 18 to 27, wherein any UE in the group of UEs operates as an initiator UE upon successful transmission of a respective PRS from the respective UE when no channel occupancy time (COT) for the sidelink position estimation procedure is active.

Clause 29. The method of any of clauses 18 to 28, wherein each PRS transmission occasion of the sidelink PRS pattern includes one or more orthogonal frequency-division multiplexing (OFDM) symbols.

Clause 30. The method of any of clauses 18 to 29, wherein only the first PRS is received from the first UE on the first PRS transmission occasion, or wherein the first PRS and one or more other signals are received from the first UE on the first PRS transmission occasion.

Clause 31. A first user equipment (UE), comprising: a memory; at least one transceiver; and at least one processor communicatively coupled to the memory and the at least one transceiver, the at least one processor configured to: determine a sidelink positioning reference signal (PRS) pattern for a sidelink position estimation procedure, the sidelink PRS pattern including at least one PRS transmission occasion for each of a group of UEs on a shared communication medium; and perform one or more attempts to transmit a first PRS on one or more PRS transmission occasions associated with the first UE in accordance with the sidelink PRS pattern.

Clause 32. The first UE of clause 31, wherein the group of UEs comprises the first UE and at least one other UE including a second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 33. The first UE of any of clauses 31 to 32, wherein the group of UEs comprises the first UE and at least one other UE including a second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 34. The first UE of any of clauses 31 to 33, wherein the at least one processor is further configured to: monitor, in response to a successful attempt to transmit the first PRS on a first PRS transmission occasion, at least a second PRS transmission occasion for receipt of a second PRS from a second UE in accordance with the sidelink PRS pattern; perform, if the second PRS is not received on the second PRS transmission occasion, one or more attempts to transmit a third PRS on one or more additional PRS transmission occasions associated with the first UE in accordance with the sidelink PRS pattern; and monitor, in response to a successful attempt to transmit the third PRS on a third PRS transmission occasion, at least a fourth PRS transmission occasion for receipt of a fourth PRS from the second UE in accordance with the sidelink PRS pattern.

Clause 35. The first UE of clause 34, wherein the second PRS is received from the second UE on the second PRS transmission occasion.

Clause 36. The first UE of clause 35, wherein the second PRS is transmitted in accordance with a contention-based protocol.

Clause 37. The first UE clause 36, wherein the contention-based protocol corresponds to Type 2 channel access.

Clause 38. The first UE of any of clauses 34 to 37, wherein a duration of the first PRS transmission occasion is different than a duration of the second PRS transmission occasion.

Clause 39. The first UE of any of clauses 31 to 38, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 40. The first UE of any of clauses 31 to 39, wherein the one or more attempts to transmit the first PRS are performed in accordance with a contention-based protocol.

Clause 41. The first UE clause 40, wherein the contention-based protocol corresponds to Type 1 channel access.

Clause 42. The first UE of any of clauses 31 to 41, wherein the first UE is an initiator UE, with a channel occupancy time (COT) for the sidelink position estimation procedure being initiated after a successful attempt to transmit the first PRS on the first PRS transmission occasion.

Clause 43. The first UE of clause 42, wherein an unsuccessful attempt to transmit PRS by a second UE or a subsequent UE cancels the COT.

Clause 44. The first UE of any of clauses 31 to 43, wherein any UE in the group of UEs operates as an initiator UE upon successful transmission of a respective PRS from the respective UE when no channel occupancy time (COT) for the sidelink position estimation procedure is active.

Clause 45. The first UE of any of clauses 31 to 44, wherein each PRS transmission occasion of the sidelink PRS pattern includes one or more orthogonal frequency-division multiplexing (OFDM) symbols.

Clause 46. The first UE of any of clauses 31 to 45, wherein only the first PRS is transmitted by the first UE on the first PRS transmission occasion, or wherein the first PRS and one or more other signals are transmitted by the first UE on the first PRS transmission occasion.

Clause 47. The first UE of clause 46, wherein the one or more other signals comprise a control signal associated with the first PRS.

Clause 48. A second user equipment (UE), comprising: a memory; at least one transceiver; and at least one processor communicatively coupled to the memory and the at least one transceiver, the at least one processor configured to: determine a sidelink positioning reference signal (PRS) pattern for a sidelink position estimation procedure, the sidelink PRS pattern including at least one PRS transmission occasion for each of a group of UEs on a shared communication medium; and monitor a first PRS transmission occasion for receipt of a first PRS from a first UE in accordance with the sidelink PRS pattern.

Clause 49. The second UE of clause 48, wherein the group of UEs comprises the first UE and at least one other UE including the second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 50. The second UE of any of clauses 48 to 49, wherein the group of UEs comprises the first UE and at least one other UE including the second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 51. The second UE of any of clauses 48 to 50, wherein the at least one processor is further configured to: selectively attempt to transmit a second PRS on a second PRS transmission occasion associated with the second UE in accordance with the sidelink PRS pattern based on whether the first PRS is received from the first UE on the first PRS occasion.

Clause 52. The second UE of clause 51, wherein the second PRS is transmitted by the second UE on the second PRS transmission occasion.

Clause 53. The second UE of clause 52, wherein the second PRS is transmitted in accordance with a contention-based protocol.

Clause 54. The second UE of clause 53, wherein the contention-based protocol corresponds to Type 2 channel access.

Clause 55. The second UE of any of clauses 51 to 54, wherein a duration of the first PRS transmission occasion is different than a duration of the second PRS transmission occasion.

Clause 56. The second UE of any of clauses 48 to 55, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 57. The second UE of any of clauses 48 to 56, wherein the first UE is an initiator UE, with a channel occupancy time (COT) for the sidelink position estimation procedure being initiated after a successful attempt to transmit the first PRS on the first PRS transmission occasion.

Clause 58. The second UE of any of clauses 48 to 57, wherein any UE in the group of UEs operates as an initiator UE upon successful transmission of a respective PRS from the respective UE when no channel occupancy time (COT) for the sidelink position estimation procedure is active.

Clause 59. The second UE of any of clauses 48 to 58, wherein each PRS transmission occasion of the sidelink PRS pattern includes one or more orthogonal frequency-division multiplexing (OFDM) symbols.

Clause 60. The second UE of any of clauses 48 to 59, wherein only the first PRS is received from the first UE on the first PRS transmission occasion, or wherein the first PRS and one or more other signals are received from the first UE on the first PRS transmission occasion.

Clause 61. A first user equipment (UE), comprising: means for determining a sidelink positioning reference signal (PRS) pattern for a sidelink position estimation procedure, the sidelink PRS pattern including at least one PRS transmission occasion for each of a group of UEs on a shared communication medium; and means for performing one or more attempts to transmit a first PRS on one or more PRS transmission occasions associated with the first UE in accordance with the sidelink PRS pattern.

Clause 62. The first UE of clause 61, wherein the group of UEs comprises the first UE and at least one other UE including a second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 63. The first UE of any of clauses 61 to 62, wherein the group of UEs comprises the first UE and at least one other UE including a second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 64. The first UE of any of clauses 61 to 63, further comprising: means for monitoring, in response to a successful attempt to transmit the first PRS on a first PRS transmission occasion, at least a second PRS transmission occasion for receipt of a second PRS from a second UE in accordance with the sidelink PRS pattern; means for performing, if the second PRS is not received on the second PRS transmission occasion, one or more attempts to transmit a third PRS on one or more additional PRS transmission occasions associated with the first UE in accordance with the sidelink PRS pattern; and means for monitoring, in response to a successful attempt to transmit the third PRS on a third PRS transmission occasion, at least a fourth PRS transmission occasion for receipt of a fourth PRS from the second UE in accordance with the sidelink PRS pattern.

Clause 65. The first UE of clause 64, wherein the second PRS is received from the second UE on the second PRS transmission occasion.

Clause 66. The first UE of clause 65, wherein the second PRS is transmitted in accordance with a contention-based protocol.

Clause 67. The first UE clause 66, wherein the contention-based protocol corresponds to Type 2 channel access.

Clause 68. The first UE of any of clauses 64 to 67, wherein a duration of the first PRS transmission occasion is different than a duration of the second PRS transmission occasion.

Clause 69. The first UE of any of clauses 61 to 68, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 70. The first UE of any of clauses 61 to 69, wherein the one or more attempts to transmit the first PRS are performed in accordance with a contention-based protocol.

Clause 71. The first UE clause 70, wherein the contention-based protocol corresponds to Type 1 channel access.

Clause 72. The first UE of any of clauses 61 to 71, wherein the first UE is an initiator UE, with a channel occupancy time (COT) for the sidelink position estimation procedure being initiated after a successful attempt to transmit the first PRS on the first PRS transmission occasion.

Clause 73. The first UE of clause 72, wherein an unsuccessful attempt to transmit PRS by a second UE or a subsequent UE cancels the COT.

Clause 74. The first UE of any of clauses 61 to 73, wherein any UE in the group of UEs operates as an initiator UE upon successful transmission of a respective PRS from the respective UE when no channel occupancy time (COT) for the sidelink position estimation procedure is active.

Clause 75. The first UE of any of clauses 61 to 74, wherein each PRS transmission occasion of the sidelink PRS pattern includes one or more orthogonal frequency-division multiplexing (OFDM) symbols.

Clause 76. The first UE of any of clauses 61 to 75, wherein only the first PRS is transmitted by the first UE on the first PRS transmission occasion, or wherein the first PRS and one or more other signals are transmitted by the first UE on the first PRS transmission occasion.

Clause 77. The first UE of clause 76, wherein the one or more other signals comprise a control signal associated with the first PRS.

Clause 78. A second user equipment (UE), comprising: means for determining a sidelink positioning reference signal (PRS) pattern for a sidelink position estimation procedure, the sidelink PRS pattern including at least one PRS transmission occasion for each of a group of UEs on a shared communication medium; and means for monitoring a first PRS transmission occasion for receipt of a first PRS from a first UE in accordance with the sidelink PRS pattern.

Clause 79. The second UE of clause 78, wherein the group of UEs comprises the first UE and at least one other UE including the second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 80. The second UE of any of clauses 78 to 79, wherein the group of UEs comprises the first UE and at least one other UE including the second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 81. The second UE of any of clauses 78 to 80, further comprising: means for selectively attempting to transmit a second PRS on a second PRS transmission occasion associated with the second UE in accordance with the sidelink PRS pattern based on whether the first PRS is received from the first UE on the first PRS occasion.

Clause 82. The second UE of clause 81, wherein the second PRS is transmitted by the second UE on the second PRS transmission occasion.

Clause 83. The second UE of clause 82, wherein the second PRS is transmitted in accordance with a contention-based protocol.

Clause 84. The second UE of clause 83, wherein the contention-based protocol corresponds to Type 2 channel access.

Clause 85. The second UE of any of clauses 81 to 84, wherein a duration of the first PRS transmission occasion is different than a duration of the second PRS transmission occasion.

Clause 86. The second UE of any of clauses 78 to 85, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 87. The second UE of any of clauses 78 to 86, wherein the first UE is an initiator UE, with a channel occupancy time (COT) for the sidelink position estimation procedure being initiated after a successful attempt to transmit the first PRS on the first PRS transmission occasion.

Clause 88. The second UE of any of clauses 78 to 87, wherein any UE in the group of UEs operates as an initiator UE upon successful transmission of a respective PRS from the respective UE when no channel occupancy time (COT) for the sidelink position estimation procedure is active.

Clause 89. The second UE of any of clauses 78 to 88, wherein each PRS transmission occasion of the sidelink PRS pattern includes one or more orthogonal frequency-division multiplexing (OFDM) symbols.

Clause 90. The second UE of any of clauses 78 to 89, wherein only the first PRS is received from the first UE on the first PRS transmission occasion, or wherein the first PRS and one or more other signals are received from the first UE on the first PRS transmission occasion.

Clause 91. A non-transitory computer-readable medium storing computer-executable instructions that, when executed by a first user equipment (UE), cause the first UE to: determine a sidelink positioning reference signal (PRS) pattern for a sidelink position estimation procedure, the sidelink PRS pattern including at least one PRS transmission occasion for each of a group of UEs on a shared communication medium; and perform one or more attempts to transmit a first PRS on one or more PRS transmission occasions associated with the first UE in accordance with the sidelink PRS pattern.

Clause 92. The non-transitory computer-readable medium of clause 91, wherein the group of UEs comprises the first UE and at least one other UE including a second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 93. The non-transitory computer-readable medium of any of clauses 91 to 92, wherein the group of UEs comprises the first UE and at least one other UE including a second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 94. The non-transitory computer-readable medium of any of clauses 91 to 93, further comprising computer-executable instructions that, when executed by the first UE, cause the first UE to: monitor, in response to a successful attempt to transmit the first PRS on a first PRS transmission occasion, at least a second PRS transmission occasion for receipt of a second PRS from a second UE in accordance with the sidelink PRS pattern; perform, if the second PRS is not received on the second PRS transmission occasion, one or more attempts to transmit a third PRS on one or more additional PRS transmission occasions associated with the first UE in accordance with the sidelink PRS pattern; and monitor, in response to a successful attempt to transmit the third PRS on a third PRS transmission occasion, at least a fourth PRS transmission occasion for receipt of a fourth PRS from the second UE in accordance with the sidelink PRS pattern.

Clause 95. The non-transitory computer-readable medium of clause 94, wherein the second PRS is received from the second UE on the second PRS transmission occasion.

Clause 96. The non-transitory computer-readable medium of clause 95, wherein the second PRS is transmitted in accordance with a contention-based protocol.

Clause 97. The non-transitory computer-readable medium of clause 96, wherein the contention-based protocol corresponds to Type 2 channel access.

Clause 98. The non-transitory computer-readable medium of any of clauses 94 to 97, wherein a duration of the first PRS transmission occasion is different than a duration of the second PRS transmission occasion.

Clause 99. The non-transitory computer-readable medium of any of clauses 91 to 98, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 100. The non-transitory computer-readable medium of any of clauses 91 to 99, wherein the one or more attempts to transmit the first PRS are performed in accordance with a contention-based protocol.

Clause 101. The non-transitory computer-readable medium clause 100, wherein the contention-based protocol corresponds to Type 1 channel access.

Clause 102. The non-transitory computer-readable medium of any of clauses 91 to 101, wherein the first UE is an initiator UE, with a channel occupancy time (COT) for the sidelink position estimation procedure being initiated after a successful attempt to transmit the first PRS on the first PRS transmission occasion.

Clause 103. The non-transitory computer-readable medium of clause 102, wherein an unsuccessful attempt to transmit PRS by a second UE or a subsequent UE cancels the COT.

Clause 104. The non-transitory computer-readable medium of any of clauses 91 to 103, wherein any UE in the group of UEs operates as an initiator UE upon successful transmission of a respective PRS from the respective UE when no channel occupancy time (COT) for the sidelink position estimation procedure is active.

Clause 105. The non-transitory computer-readable medium of any of clauses 91 to 104, wherein each PRS transmission occasion of the sidelink PRS pattern includes one or more orthogonal frequency-division multiplexing (OFDM) symbols.

Clause 106. The non-transitory computer-readable medium of any of clauses 91 to 105, wherein only the first PRS is transmitted by the first UE on the first PRS transmission occasion, or wherein the first PRS and one or more other signals are transmitted by the first UE on the first PRS transmission occasion.

Clause 107. The non-transitory computer-readable medium of clause 106, wherein the one or more other signals comprise a control signal associated with the first PRS.

Clause 108. A non-transitory computer-readable medium storing computer-executable instructions that, when executed by a second user equipment (UE), cause the second UE to: determine a sidelink positioning reference signal (PRS) pattern for a sidelink position estimation procedure, the sidelink PRS pattern including at least one PRS transmission occasion for each of a group of UEs on a shared communication medium; and monitor a first PRS transmission occasion for receipt of a first PRS from a first UE in accordance with the sidelink PRS pattern.

Clause 109. The non-transitory computer-readable medium of clause 108, wherein the group of UEs comprises the first UE and at least one other UE including the second UE, wherein the sidelink PRS pattern includes N PRS transmission occasions associated with the first UE, and wherein the sidelink PRS pattern includes N PRS transmission occasions that are split between the at least one other UE, with each of the N PRS transmission occasions associated with the first UE being paired with one respective PRS transmission occasion from among the N PRS transmission occasions that are split between the at least one other UE.

Clause 110. The non-transitory computer-readable medium of any of clauses 108 to 109, wherein the group of UEs comprises the first UE and at least one other UE including the second UE, wherein the sidelink PRS pattern includes N PRS transmission occasions associated with the first UE, and wherein each of the N PRS transmission occasions is paired with one respective PRS transmission occasion associated with each UE among the at least one other UE.

Clause 111. The non-transitory computer-readable medium of any of clauses 108 to 110, further comprising computer-executable instructions that, when executed by the second UE, cause the second UE to: selectively attempt to transmit a second PRS on a second PRS transmission occasion associated with the second UE in accordance with the sidelink PRS pattern based on whether the first PRS is received from the first UE on the first PRS occasion.

Clause 112. The non-transitory computer-readable medium of clause 111, wherein the second PRS is transmitted by the second UE on the second PRS transmission occasion.

Clause 113. The non-transitory computer-readable medium of clause 112, wherein the second PRS is transmitted in accordance with a contention-based protocol.

Clause 114. The non-transitory computer-readable medium of clause 113, wherein the contention-based protocol corresponds to Type 2 channel access.

Clause 115. The non-transitory computer-readable medium of any of clauses 111 to 114, wherein a duration of the first PRS transmission occasion is different than a duration of the second PRS transmission occasion.

Clause 116. The non-transitory computer-readable medium of any of clauses 108 to 115, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of sidelink PRS transmission occasions to the group of UEs, or wherein a duration of each PRS transmission occasion of the sidelink PRS pattern is configured during formation of the group of UEs, or any combination thereof.

Clause 117. The non-transitory computer-readable medium of any of clauses 108 to 116, wherein the first UE is an initiator UE, with a channel occupancy time (COT) for the sidelink position estimation procedure being initiated after a successful attempt to transmit the first PRS on the first PRS transmission occasion.

Clause 118. The non-transitory computer-readable medium of any of clauses 108 to 117, wherein any UE in the group of UEs operates as an initiator UE upon successful transmission of a respective PRS from the respective UE when no channel occupancy time (COT) for the sidelink position estimation procedure is active.

Clause 119. The non-transitory computer-readable medium of any of clauses 108 to 118, wherein each PRS transmission occasion of the sidelink PRS pattern includes one or more orthogonal frequency-division multiplexing (OFDM) symbols.

Clause 120. The non-transitory computer-readable medium of any of clauses 108 to 119, wherein only the first PRS is received from the first UE on the first PRS transmission occasion, or wherein the first PRS and one or more other signals are received from the first UE on the first PRS transmission occasion.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a first user equipment (UE), comprising:
   determining a sidelink positioning reference signal (PRS) pattern for a sidelink position estimation procedure, the sidelink PRS pattern including at least one PRS transmission occasion for each of a group of UEs on a shared communication medium; and
   performing one or more attempts to transmit a first PRS on one or more PRS transmission occasions associated with the first UE in accordance with the sidelink PRS pattern,
   wherein any UE in the group of UEs operates as an initiator UE upon successful transmission of a respective PRS from the initiator UE when no channel occupancy time (COT) for the sidelink position estimation procedure is active, or
   wherein each PRS transmission occasion of the sidelink PRS pattern includes one or more orthogonal frequency-division multiplexing (OFDM) symbols, or
   wherein only the first PRS is transmitted by the first UE on the first PRS transmission occasion, or
   wherein the first PRS and one or more other signals are transmitted by the first UE on the first PRS transmission occasion, or wherein the one or more other signals comprise a control signal associated with the first PRS, or any combination thereof.

2. The method of claim 1, wherein the group of UEs comprises the first UE and at least one other UE, wherein the sidelink PRS pattern includes N PRS transmission occasions associated with the first UE, and wherein each of the N PRS transmission occasions is paired with one respective PRS transmission occasion associated with each UE among the at least one other UE.

3. The method of claim 1, wherein a time location associated with the sidelink PRS pattern is determined and shared among the group of UEs during formation of the group of UEs, or wherein the time location includes a starting time and duration of the sidelink PRS pattern, or wherein the sidelink PRS pattern comprises an allocation of the sidelink PRS transmission occasions to the group of UEs, or wherein a duration of each PRS transmission occasion of the sidelink PRS pattern is configured during formation of the group of UEs, or any combination thereof.

4. The method of claim 1, wherein the one or more attempts to transmit the first PRS are performed in accordance with a contention-based protocol, or wherein the contention-based protocol corresponds to Type 1 channel access, or a combination thereof.

5. The method of claim 1, wherein the first UE is the initiator UE, with a COT for the sidelink position estimation procedure being initiated after a successful attempt to transmit the first PRS on the first PRS transmission occasion, or wherein an unsuccessful attempt to transmit PRS by a second UE or a subsequent UE cancels the COT, or a combination thereof.

6. A method of operating a first user equipment (UE), comprising:

determining a sidelink positioning reference signal (PRS) pattern for a sidelink position estimation procedure, the sidelink PRS pattern including at least one PRS transmission occasion for each of a group of UEs on a shared communication medium; and performing one or more attempts to transmit a first PRS on one or more PRS transmission occasions associated with the first UE in accordance with the sidelink PRS pattern, wherein the group of UEs comprises the first UE and at least one other UE, wherein the sidelink PRS pattern includes N PRS transmission occasions associated with the first UE, and wherein the sidelink PRS pattern includes N PRS transmission occasions that are split between the first UE and the at least one other UE, with each of the N PRS transmission occasions associated with the first UE being paired with one respective PRS transmission occasion from among the N PRS transmission occasions that are split between the first UE and the at least one other UE.

7. A method of operating a first user equipment (UE), comprising:

determining a sidelink positioning reference signal (PRS) pattern for a sidelink position estimation procedure, the sidelink PRS pattern including at least one PRS transmission occasion for each of a group of UEs on a shared communication medium;

performing one or more attempts to transmit a first PRS on one or more PRS transmission occasions associated with the first UE in accordance with the sidelink PRS pattern;

monitoring, in response to a successful attempt to transmit the first PRS on a first PRS of the one or more PRS transmission occasions, at least a second PRS transmission occasion for receipt of a second PRS from a second UE in accordance with the sidelink PRS pattern;

performing, if the second PRS is not received on the second PRS transmission occasion, one or more attempts to transmit a third PRS on one or more additional PRS transmission occasions associated with the first UE in accordance with the sidelink PRS pattern; and monitoring, in response to a successful attempt to transmit the third PRS on a third PRS transmission occasion, at least a fourth PRS transmission occasion for receipt of a fourth PRS from the second UE in accordance with the sidelink PRS pattern.

8. The method of claim 7, wherein the second PRS is received from the second UE on the second PRS transmission occasion, or wherein the second PRS is transmitted in accordance with a contention-based protocol, or wherein the contention-based protocol corresponds to Type 2 channel access, or wherein a duration of the first PRS transmission occasion is different than a duration of the second PRS transmission occasion, or any combination thereof.

9. A method of operating a second user equipment (UE), comprising:

determining a sidelink positioning reference signal (PRS) pattern for a sidelink position estimation procedure, the sidelink PRS pattern including at least one PRS transmission occasion for each of a group of UEs on a shared communication medium; and monitoring a first PRS transmission occasion for receipt of a first PRS from a first UE in accordance with the sidelink PRS pattern, wherein any UE in the group of UEs operates as an initiator UE upon successful transmission of a respective PRS from the initiator UE when no channel occupancy time (COT) for the sidelink position estimation procedure is active, or wherein each PRS transmission occasion of the sidelink PRS pattern includes one or more orthogonal frequency-division multiplexing (OFDM) symbols, or wherein only the first PRS is transmitted by the first UE on the first PRS transmission occasion, or wherein the first PRS and one or more other signals are transmitted by the first UE on the first PRS transmission occasion, or wherein the one or more other signals comprise a control signal associated with the first PRS, or any combination thereof.

10. The method of claim 9, wherein the group of UEs comprises the first UE and at least one other UE, wherein the sidelink PRS pattern includes N PRS transmission occasions associated with the first UE, and wherein each of the N PRS transmission occasions is paired with one respective PRS transmission occasion associated with each UE among the at least one other UE.

11. The method of claim 9, further comprising:
selectively attempting to transmit a second PRS on a second PRS transmission occasion associated with the second UE in accordance with the sidelink PRS pattern based on whether the first PRS is received from the first UE on the first PRS occasion.

12. The method of claim 11,
wherein the second PRS is transmitted by the second UE on the second PRS transmission occasion, or
wherein the second PRS is transmitted in accordance with a contention-based protocol, or
wherein a duration of the first PRS transmission occasion is different than a duration of the second PRS transmission occasion, or
any combination thereof.

13. The method of claim 12, wherein the contention-based protocol corresponds to Type 2 channel access.

14. The method of claim 9,
wherein a time location associated with the sidelink PRS pattern is determined and shared among the group of UEs during formation of the group of UEs, or
wherein the time location includes a starting time and duration of the sidelink PRS pattern, or
wherein the sidelink PRS pattern comprises an allocation of the sidelink PRS transmission occasions to the group of UEs, or
wherein a duration of each PRS transmission occasion of the sidelink PRS pattern is configured during formation of the group of UEs, or
any combination thereof.

15. The method of claim 9, wherein the first UE is the initiator UE, with the COT for the sidelink position estimation procedure being initiated after a successful attempt to transmit the first PRS on the first PRS transmission occasion.

16. The method of claim 9, wherein any UE in the group of UEs operates as the initiator UE upon the successful transmission of the respective PRS from the initiator UE when no COT for the sidelink position estimation procedure is active.

17. The method of claim 9, wherein each PRS transmission occasion of the sidelink PRS pattern includes the one or more OFDM symbols.

18. The method of claim 9,
wherein only the first PRS is received from the first UE on the first PRS transmission occasion, or
wherein the first PRS and the one or more other signals are received from the first UE on the first PRS transmission occasion.

19. A method of operating a second user equipment (UE), comprising:
determining a sidelink positioning reference signal (PRS) pattern for a sidelink position estimation procedure, the sidelink PRS pattern including at least one PRS transmission occasion for each of a group of UEs on a shared communication medium; and
monitoring a first PRS transmission occasion for receipt of a first PRS from a first UE in accordance with the sidelink PRS pattern,
wherein the group of UEs comprises the first UE and at least one other UE,
wherein the sidelink PRS pattern includes N PRS transmission occasions associated with the first UE, and wherein the sidelink PRS pattern includes N PRS transmission occasions that are split between the first UE and the at least one other UE, with each of the N PRS transmission occasions associated with the first UE being paired with one respective PRS transmission occasion from among the N PRS transmission occasions that are split between the first UE and the at least one other UE.

20. A first user equipment (UE), comprising:
a memory;
at least one transceiver; and
at least one processor communicatively coupled to the memory and the at least one transceiver, the at least one processor configured to:
determine a sidelink positioning reference signal (PRS) pattern for a sidelink position estimation procedure, the sidelink PRS pattern including at least one PRS transmission occasion for each of a group of UEs on a shared communication medium; and
perform one or more attempts to transmit a first PRS on one or more PRS transmission occasions associated with the first UE in accordance with the sidelink PRS pattern,
wherein any UE in the group of UEs operates as an initiator UE upon successful transmission of a respective PRS from the initiator UE when no channel occupancy time (COT) for the sidelink position estimation procedure is active, or
wherein each PRS transmission occasion of the sidelink PRS pattern includes one or more orthogonal frequency-division multiplexing (OFDM) symbols, or
wherein only the first PRS is transmitted by the first UE on the first PRS transmission occasion, or
wherein the first PRS and one or more other signals are transmitted by the first UE on the first PRS transmission occasion, or
wherein the one or more other signals comprise a control signal associated with the first PRS, or
any combination thereof.

21. The first UE of claim 20,
wherein the group of UEs comprises the first UE and at least one other UE,
wherein the sidelink PRS pattern includes N PRS transmission occasions associated with the first UE, and
wherein each of the N PRS transmission occasions is paired with one respective PRS transmission occasion associated with each UE among the at least one other UE.

22. The first UE of claim 20,
wherein a time location associated with the sidelink PRS pattern is determined and shared among the group of UEs during formation of the group of UEs, or
wherein the time location includes a starting time and duration of the sidelink PRS pattern, or
wherein the sidelink PRS pattern comprises an allocation of the sidelink PRS transmission occasions to the group of UEs, or
wherein a duration of each PRS transmission occasion of the sidelink PRS pattern is configured during formation of the group of UEs, or
any combination thereof.

23. The first UE of claim 20, wherein the one or more attempts to transmit the first PRS are performed in accordance with a contention-based protocol, or
　wherein the contention-based protocol corresponds to Type 1 channel access, or
　a combination thereof.

24. The first UE of claim 20,
　wherein the first UE is the initiator UE, with the COT for the sidelink position estimation procedure being initiated after a successful attempt to transmit the first PRS on the first PRS transmission occasion, or
　wherein an unsuccessful attempt to transmit PRS by a second UE or a subsequent UE cancels the COT, or
　a combination thereof.

25. A first user equipment (UE), comprising:
　a memory;
　at least one transceiver; and
　at least one processor communicatively coupled to the memory and the at least one transceiver, the at least one processor configured to:
　determine a sidelink positioning reference signal (PRS) pattern for a sidelink position estimation procedure, the sidelink PRS pattern including at least one PRS transmission occasion for each of a group of UEs on a shared communication medium; and
　perform one or more attempts to transmit a first PRS on one or more PRS transmission occasions associated with the first UE in accordance with the sidelink PRS pattern,
　wherein the group of UEs comprises the first UE and at least one other UE,
　wherein the sidelink PRS pattern includes N PRS transmission occasions associated with the first UE, and
　wherein the sidelink PRS pattern includes N PRS transmission occasions that are split between the first UE and the at least one other UE, with each of the N PRS transmission occasions associated with the first UE being paired with one respective PRS transmission occasion from among the N PRS transmission occasions that are split between the first UE and the at least one other UE.

26. A first user equipment (UE), comprising:
　a memory;
　at least one transceiver; and
　at least one processor communicatively coupled to the memory and the at least one transceiver, the at least one processor configured to:
　determine a sidelink positioning reference signal (PRS) pattern for a sidelink position estimation procedure, the sidelink PRS pattern including at least one PRS transmission occasion for each of a group of UEs on a shared communication medium;
　perform one or more attempts to transmit a first PRS on one or more PRS transmission occasions associated with the first UE in accordance with the sidelink PRS pattern;
　monitor, in response to a successful attempt to transmit the first PRS on a first PRS transmission occasion, at least a second PRS transmission occasion for receipt of a second PRS from a second UE in accordance with the sidelink PRS pattern;
　perform, if the second PRS is not received on the second PRS transmission occasion, one or more attempts to transmit a third PRS on one or more additional PRS transmission occasions associated with the first UE in accordance with the sidelink PRS pattern; and
　monitor, in response to a successful attempt to transmit the third PRS on a third PRS transmission occasion, at least a fourth PRS transmission occasion for receipt of a fourth PRS from the second UE in accordance with the sidelink PRS pattern.

27. The first UE of claim 26,
　wherein the second PRS is received from the second UE on the second PRS transmission occasion, or
　wherein the second PRS is transmitted in accordance with a contention-based protocol, or
　wherein the contention-based protocol corresponds to Type 2 channel access, or
　wherein a duration of the first PRS transmission occasion is different than a duration of the second PRS transmission occasion, or
　any combination thereof.

28. A second user equipment (UE), comprising:
　a memory;
　at least one transceiver; and
　at least one processor communicatively coupled to the memory and the at least one transceiver, the at least one processor configured to:
　determine a sidelink positioning reference signal (PRS) pattern for a sidelink position estimation procedure, the sidelink PRS pattern including at least one PRS transmission occasion for each of a group of UEs on a shared communication medium; and
　monitor a first PRS transmission occasion for receipt of a first PRS from a first UE in accordance with the sidelink PRS pattern,
　wherein any UE in the group of UEs operates as an initiator UE upon successful transmission of a respective PRS from the initiator UE when no channel occupancy time (COT) for the sidelink position estimation procedure is active, or
　wherein each PRS transmission occasion of the sidelink PRS pattern includes one or more orthogonal frequency-division multiplexing (OFDM) symbols, or
　wherein only the first PRS is transmitted by the first UE on the first PRS transmission occasion, or
　wherein the first PRS and one or more other signals are transmitted by the first UE on the first PRS transmission occasion, or
　wherein the one or more other signals comprise a control signal associated with the first PRS, or
　any combination thereof.

29. The second UE of claim 28,
　wherein the group of UEs comprises the first UE and at least one other UE,
　wherein the sidelink PRS pattern includes N PRS transmission occasions associated with the first UE, and
　wherein each of the N PRS transmission occasions is paired with one respective PRS transmission occasion associated with each UE among the at least one other UE.

30. The second UE of claim 28, wherein the at least one processor is further configured to:
　selectively attempt to transmit a second PRS on a second PRS transmission occasion associated with the second UE in accordance with the sidelink PRS pattern based on whether the first PRS is received from the first UE on the first PRS occasion.

31. The second UE of claim 30,
　wherein the second PRS is transmitted by the second UE on the second PRS transmission occasion, or
　wherein the second PRS is transmitted in accordance with a contention-based protocol, or wherein a duration of the first PRS transmission occasion is different than a duration of the second PRS transmission occasion, or any combination thereof.

32. The second UE of claim 31, wherein the contention-based protocol corresponds to Type 2 channel access.

33. The second UE of claim 28,
wherein a time location associated with the sidelink PRS pattern is determined and shared among the group of UEs during formation of the group of UEs, or
wherein the time location includes a starting time and duration of the sidelink PRS pattern, or
wherein the sidelink PRS pattern comprises an allocation of the sidelink PRS transmission occasions to the group of UEs, or
wherein a duration of each PRS transmission occasion of the sidelink PRS pattern is configured during formation of the group of UEs, or
any combination thereof.

34. The second UE of claim 28, wherein the first UE is the initiator UE, with the COT for the sidelink position estimation procedure being initiated after a successful attempt to transmit the first PRS on the first PRS transmission occasion.

35. The second UE of claim 28, wherein any UE in the group of UEs operates as the initiator UE upon the successful transmission of the respective PRS from the initiator UE when no COT for the sidelink position estimation procedure is active.

36. The second UE of claim 28, wherein each PRS transmission occasion of the sidelink PRS pattern includes the one or more OFDM symbols.

37. The second UE of claim 28,
wherein only the first PRS is received from the first UE on the first PRS transmission occasion, or
wherein the first PRS and one or more other signals are received from the first UE on the first PRS transmission occasion.

38. A second user equipment (UE), comprising:
a memory;
at least one transceiver; and
at least one processor communicatively coupled to the memory and the at least one transceiver, the at least one processor configured to:
determine a sidelink positioning reference signal (PRS) pattern for a sidelink position estimation procedure, the sidelink PRS pattern including at least one PRS transmission occasion for each of a group of UEs on a shared communication medium; and
monitor a first PRS transmission occasion for receipt of a first PRS from a first UE in accordance with the sidelink PRS pattern,
wherein the group of UEs comprises the first UE and at least one other UE,
wherein the sidelink PRS pattern includes N PRS transmission occasions associated with the first UE, and
wherein the sidelink PRS pattern includes N PRS transmission occasions that are split between the first UE and the at least one other UE, with each of the N PRS transmission occasions associated with the first UE being paired with one respective PRS transmission occasion from among the N PRS transmission occasions that are split between the first UE and the at least one other UE.

* * * * *